(12) United States Patent
Wang et al.

(10) Patent No.: US 12,120,360 B2
(45) Date of Patent: Oct. 15, 2024

(54) TILE SIGNALING IN VIDEO CODING

(71) Applicant: Huawei Technologies Co., Ltd., Shenzhen (CN)

(72) Inventors: Ye-Kui Wang, San Diego, CA (US); Fnu Hendry, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/199,018

(22) Filed: Mar. 11, 2021

(65) Prior Publication Data

US 2021/0211663 A1 Jul. 8, 2021

Related U.S. Application Data

(63) Continuation of application No. PCT/US2019/051152, filed on Sep. 13, 2019.
(Continued)

(51) Int. Cl.
*H04N 19/184* (2014.01)
*H04N 19/119* (2014.01)
*H04N 19/169* (2014.01)
*H04N 19/174* (2014.01)
*H04N 19/176* (2014.01)
*H04N 19/46* (2014.01)
(Continued)

(52) U.S. Cl.
CPC ........... *H04N 19/96* (2014.11); *H04N 19/119* (2014.11); *H04N 19/174* (2014.11); *H04N 19/176* (2014.11); *H04N 19/184* (2014.11); *H04N 19/1883* (2014.11); *H04N 19/46* (2014.11); *H04N 19/70* (2014.11)

(58) Field of Classification Search
CPC .... H04N 19/96; H04N 19/119; H04N 19/174; H04N 19/176; H04N 19/184; H04N 19/1883; H04N 19/46; H04N 19/70
See application file for complete search history.

(56) References Cited

U.S. PATENT DOCUMENTS 9,826,245 B2 * 11/2017 Maeda ................. H04N 19/436
2006/0280363 A1   12/2006 Umeda
(Continued)

FOREIGN PATENT DOCUMENTS

CN       1882036 A       12/2006
CN     101389021 A        3/2009
(Continued)

OTHER PUBLICATIONS

Bross, B., "Versatile Video Coding (Draft 2)," JVET-K1001-v4, 11th Meeting: Ljubljana, SI, Jul. 10-18, 2018, 86 pages.
(Continued)

*Primary Examiner* — Dave Czekaj
*Assistant Examiner* — Berteau Joisil
(74) *Attorney, Agent, or Firm* — Conley Rose, P.C.

(57) ABSTRACT

A video coding mechanism is disclosed. The mechanism includes receiving a bitstream including image data divided into one or more slices. The one or more slices are further divided into one or more tiles. The mechanism further includes determining that a first slice contains a single tile based on a first flag. The mechanism further includes decoding the first slice to generate a reconstructed image.

20 Claims, 11 Drawing Sheets

Related U.S. Application Data

(60) Provisional application No. 62/731,696, filed on Sep. 14, 2018.

(51) Int. Cl.
*H04N 19/70* (2014.01)
*H04N 19/96* (2014.01)

(56) References Cited

U.S. PATENT DOCUMENTS

| | | |
|---|---|---|
| 2008/0129648 A1 | 6/2008 | Hagiwara et al. |
| 2009/0002379 A1 | 1/2009 | Baeza et al. |
| 2013/0016771 A1* | 1/2013 | Misra ............... H04N 19/13 375/240.03 |
| 2013/0077681 A1 | 3/2013 | Chen et al. |
| 2013/0114735 A1 | 5/2013 | Wang |
| 2013/0182774 A1 | 7/2013 | Wang et al. |
| 2013/0215975 A1 | 8/2013 | Samuelsson et al. |
| 2014/0079135 A1* | 3/2014 | Van der Auwera .... H04N 19/96 375/240.18 |
| 2014/0185672 A1 | 7/2014 | Terada et al. |
| 2014/0219346 A1 | 8/2014 | Ugur et al. |
| 2014/0301451 A1 | 10/2014 | Deshpande |
| 2014/0341278 A1 | 11/2014 | Zheng et al. |
| 2015/0016503 A1 | 1/2015 | Rapaka et al. |
| 2015/0016506 A1 | 1/2015 | Fu et al. |
| 2015/0103920 A1 | 4/2015 | Rapaka et al. |
| 2015/0103927 A1 | 4/2015 | Hannuksela |
| 2015/0110118 A1 | 4/2015 | Ouedraogo et al. |
| 2015/0146794 A1 | 5/2015 | Hoang |
| 2015/0208095 A1 | 7/2015 | Schierl et al. |
| 2015/0341642 A1 | 11/2015 | Hendry et al. |
| 2016/0057441 A1 | 2/2016 | Skupin et al. |
| 2016/0198157 A1 | 7/2016 | Segall et al. |
| 2016/0330255 A1 | 11/2016 | Denoual et al. |
| 2016/0353128 A1 | 12/2016 | Wozniak et al. |
| 2017/0289556 A1 | 10/2017 | Hendry et al. |
| 2017/0346873 A1* | 11/2017 | Denoual ............... H04N 21/845 |
| 2018/0176601 A1 | 6/2018 | Jeong et al. |
| 2018/0242028 A1 | 8/2018 | Van Brandenburg et al. |
| 2019/0394487 A1 | 12/2019 | Lim et al. |
| 2021/0204000 A1 | 7/2021 | Wang et al. |
| 2021/0211662 A1 | 7/2021 | Wang et al. |
| 2021/0211664 A1 | 7/2021 | Wang et al. |

FOREIGN PATENT DOCUMENTS

| | | | |
|---|---|---|---|
| CN | 104054347 A | 9/2014 | |
| CN | 104737538 A | 6/2015 | |
| CN | 105637864 A | 6/2016 | |
| CN | 107925773 A | 4/2018 | |
| KR | 20180101123 A | 9/2018 | |
| WO | WO-2019103126 A1 * | 5/2019 | ............. H04N 19/70 |
| WO | WO-2020008103 A1 * | 1/2020 | ........... H04N 19/172 |

OTHER PUBLICATIONS

Chen, J., "Algorithm description for Versatile Video Coding and Test Model 2," JVET-K1002-v1, 11th Meeting: Ljubljana, SI, Jul. 10-18, 2018, 19 pages.

"Line Transmission of Non-Telephone Signals, Video Codec for Audio Visual Services at px64 kbits," ITU-T H.261, Mar. 1993, 29 pages.

"Series H: Audiovisual and Multimedia Systems, Infrastructure of audiovisual services—Coding of moving video, Information technology—Generic coding of moving pictures and associated audio information: Video," ITU-T H.262, Feb. 2000, 220 pages.

"Series H: Audiovisual and Multimedia Systems, Infrastructure of audiovisual services—Coding of moving video, Video coding for low bit rate communication," ITU-T H.263, Feb. 1998, 167 pages.

"Series H: Audiovisual and Multimedia Systems, Infrastructure of audiovisual services—Coding of moving video, High efficiency video coding," ITU-T H.265, Apr. 2013, 317 pages.

Zexiang, M., "Research on Next Generation Video Coding Technology Based on HEVC," University of Electronic Science and Technology, 2018, Issue 02, 2 pages (abstract).

Document: JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

"Series H: Audiovisual and Multimedia Systems Infrastructure of audiovisual services—Coding of moving video Advanced video coding for generic audiovisual services," Recommendation ITU-T H.264, Jun. 2019, 836 pages.

* cited by examiner

TILE SIGNALING IN VIDEO CODING

CROSS-REFERENCE TO RELATED APPLICATIONS

This patent application is a continuation of International Application No. PCT/US2019/051152, filed Sep. 13, 2019 by Ye-Kui Wang, et. al., and titled "Tile Signaling In Video Coding," which claims the benefit of U.S. Provisional Patent Application No. 62/731,696, filed Sep. 14, 2018 by Ye-Kui Wang, et. al., and titled "Slicing and Tiling In Video Coding," which are hereby incorporated by reference.

TECHNICAL FIELD

The present disclosure is generally related to video coding, and is specifically related to partitioning images into slices, tiles, and coding tree units (CTUs) to support increased compression in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder. The method comprises receiving, by a receiver of the decoder, a bitstream including image data divided into one or more slices. The one or more slices are further divided into one or more tiles. The method further comprises determining, by a processor of the decoder, that a first slice contains a single tile based on a first flag. The method further comprises decoding, by the processor, the first slice to generate a reconstructed image. The present disclosure includes a flag that indicates when a slice contains only one tile. The decoder generally performs several operations to determine the tiles in a slice, the IDs of those tiles, and associated entry point offsets so that the tiles can be decoded. These steps can be omitted and the associated data omitted from the bitstream when the slice contains only one tile. The case that a slice carries a single tile may occur with some frequency. Accordingly, omitting unnecessary multi-tile related computations when a single tile is present may significantly reduce computation resource usage at the decoder. Further, omitting data supporting such multi-tile related computations from the bitstream may condense the bitstream, which may decrease network communication resource usage as well as memory resource usage at both the encoder and decoder.

Optionally, in any of the preceding aspects, another implementation of the aspect provides, wherein the first flag is a single_tile_in_slice_flag set to one to indicate that there is only one tile in the first slice.

Optionally, in any of the preceding aspects, another implementation of the aspect provides, wherein the first flag is coded in a slice header associated with the first slice.

Optionally, in any of the preceding aspects, another implementation of the aspect provides, wherein decoding the first slice includes omitting a search for a bottom right tile identifier (ID) for the first slice based on the determination that the first slice contains the single tile.

Optionally, in any of the preceding aspects, another implementation of the aspect provides, wherein decoding the first slice includes omitting a search for entry point offsets associated with tiles for the first slice based on the determination that the first slice contains the single tile.

Optionally, in any of the preceding aspects, another implementation of the aspect provides, further comprising determining, by the processor, that a first picture contains the single tile based on a second flag.

Optionally, in any of the preceding aspects, another implementation of the aspect provides, wherein the second flag is a single_tile_in_pic_flag set in a picture parameter set associated with the first picture.

Optionally, in any of the preceding aspects, another implementation of the aspect provides, wherein decoding the first slice is performed as part of decoding the first picture to generate the reconstructed image, and wherein decoding the first picture includes omitting a determination of tile rows and tile columns for the first picture based on the determination that the first picture contains the single tile.

Optionally, in any of the preceding aspects, another implementation of the aspect provides, further comprising forwarding, by the processor, the reconstructed image toward a display as part of a reconstructed video sequence.

In an embodiment, the disclosure includes a method implemented in an encoder. The method comprises partitioning, by a processor of the encoder, a first image into one or more slices. The one or more slices are further partitioned into one or more tiles. The method further comprises determining, by the processor, that a first slice of the first image contains a single tile after partitioning. The method further comprises encoding, by the processor, a first flag to indicate that the first slice contains the single tile. The method further comprises encoding, by the processor, the first slice into a bitstream. The method further comprises transmitting, by a transmitter of the encoder, the bitstream containing the first flag to support decoding the first slice. The present disclosure includes a flag that indicates when a slice contains only one tile. The decoder generally performs several operations to determine the tiles in a slice, the IDs of those tiles, and associated entry point offsets so that the tiles can be decoded. These steps can be omitted and the associated data omitted from the bitstream when the slice contains only one tile. The case that a slice carries a single tile may occur with some frequency. Accordingly, omitting unnecessary multi-tile related computations when a single tile is present may significantly reduce computation resource usage at the decoder. Further, omitting data supporting such multi-tile related computations from the bitstream may condense the bitstream, which may decrease network communication resource usage as well as memory resource usage at both the encoder and decoder.

Optionally, in any of the preceding aspects, another implementation of the aspect provides, wherein the first flag is a single_tile_in_slice_flag set to one to indicate that there is only one tile in the first slice.

Optionally, in any of the preceding aspects, another implementation of the aspect provides, wherein the first flag is encoded in a slice header associated with the first slice.

Optionally, in any of the preceding aspects, another implementation of the aspect provides, wherein a bottom right tile ID for the first slice is omitted from the bitstream based on the determination that the first slice contains the single tile.

Optionally, in any of the preceding aspects, another implementation of the aspect provides, wherein entry point offsets associated with tiles for the first slice are omitted from the bitstream based on the determination that the first slice contains the single tile.

Optionally, in any of the preceding aspects, another implementation of the aspect provides, further comprising determining, by the processor, that the first image contains the single tile after partitioning, and encoding, by the processor, a single_tile_in_pic_flag in a picture parameter set associated with the first image to indicate that the first image contains the single tile.

In an embodiment, the disclosure includes a video coding device comprising a processor, a receiver coupled to the processor, and a transmitter coupled to the processor, the processor, receiver, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising a receiving means for receiving a bitstream including image data divided into one or more slices. The one or more slices are further divided into and one or more tiles. The decoder further comprises a determining means for determining that a first slice contains a single tile based on a first flag. The decoder further comprises a decoding means for decoding the first slice to generate a reconstructed image.

Optionally, in any of the preceding aspects, another implementation of the aspect provides, wherein the encoder is further configured to perform the method of any of the preceding aspects.

In an embodiment, the disclosure includes an encoder comprises a partitioning means for partitioning a first image into one or more slices. The one or more slices are further partitioned into one or more tiles. The encoder further comprises a determining means for determining that a first slice contains a single tile after partitioning. The encoder further comprises an encoding means for encoding a first flag to indicate that the first slice contains the single tile, and encoding the first slice into a bitstream. The encoder further comprises a transmitting means for transmitting the bitstream containing the first flag to support decoding the first slice.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
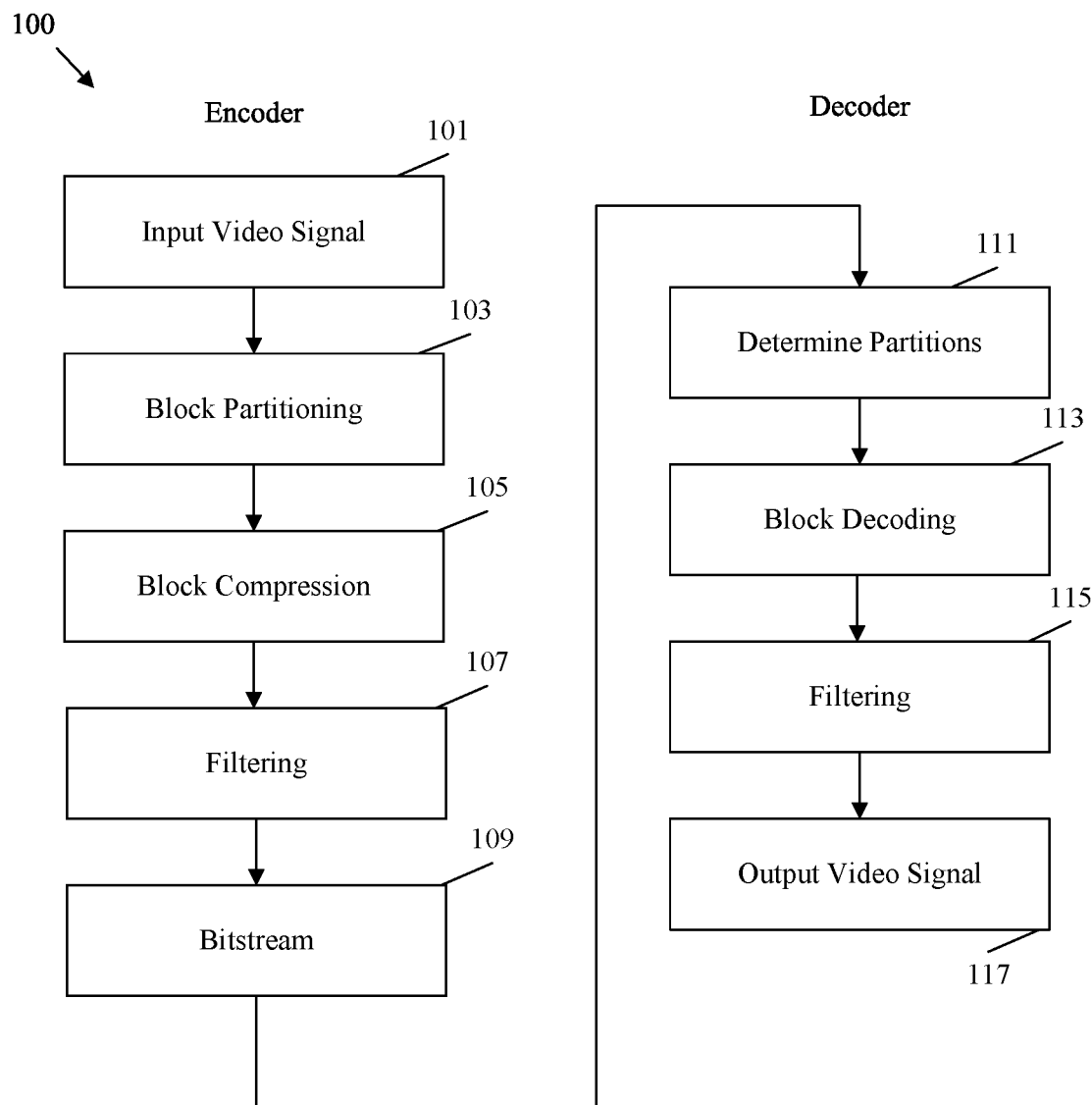
FIG. 1 is a flowchart of an example method of coding a video signal.

It should be understood at the outset that although an illustrative implementation of one or more embodiments are provided below; the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261. International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC). Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-K1001-v4 and JVET-K1002-v1.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity. HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly: dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly. CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles may also include motion constrained tile sets. A motion constrained tile set (MCTS) is a tile set designed such that associated motion vectors are restricted to point to full-sample locations inside the MCTS and to fractional-sample locations that require only full-sample locations inside the MCTS for interpolation. Further, the usage of motion vector candidates for temporal motion vector prediction derived from blocks outside the MCTS is disallowed. This way, each MCTS may be independently decoded without the existence of tiles not included in the MCTS. Temporal MCTSs supplemental enhancement information (SEI) messages may be used to indicate the existence of MCTSs in the bitstream and signal the MCTSs. The MCTSs SEI message provides supplemental information that can be used in the MCTS sub-bitstream extraction (specified as part of the semantics of the SEI message) to generate a conforming bitstream for a MCTS. The information includes a number of extraction information sets, each defining a number of MCTS sets and containing raw bytes sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs. SPSs, and PPSs) may be rewritten or replaced, and slice headers may updated because one or all of the slice address related syntax elements (including first_slice_segment_in_pic_flag and slice_segment_address) may employ different values in the extracted sub-bitstream.

The preceding tiling and slicing mechanisms provide significant flexibility to support MTU size matching and parallel processing. However. MTU size matching has become less relevant due to the ever increasing speed and reliability of telecommunication networks. For example, one of the primary uses of MTU size matching is to support displaying error-concealed pictures. An error-concealed picture is a decoded picture that is created from a transmitted coded picture when there is some data loss. Such data loss can include a loss of some slices of a coded picture or errors in reference pictures used by the coded picture (e.g., the reference picture is also an error-concealed picture). An error-concealed picture can be created by displaying the correct slices and estimating the erroneous slices, for example by copying a slice corresponding to the erroneous slice from the previous picture in the video sequence. Error-concealed pictures can be generated when each slice is contained in a single NAL unit. However, if slices are fragmented over multiple NAL units (e.g., no MTU size matching), the loss of one NAL unit can corrupt multiple slices. Generation of error-concealed pictures is less relevant in modern network environments as packet loss is a much less common occurrence and because modern network speeds allow the system to completely omit pictures with errors without causing significant video freezing as the delay between an erroneous picture and a following error-less picture is generally small. Further, the process for estimating the quality of an error-concealed picture may be complicated, and hence simply omitting the erroneous picture may be preferable. Consequently, video conversational applications, such as video conferencing and video telephony, and even broadcast applications generally forgo using error-concealed pictures.

As error-concealed pictures are less useful, MTU size matching is less useful. Further, continuing to support MTU size matching paradigms when partitioning may unnecessarily complicate coding systems and as well as use waste bits that could otherwise be omitted to increase coding efficiency. In addition, some tiling schemes (e.g., MCTS) allow sub-pictures of a picture to be displayed. In order to display a sub-picture, slices in a region of interest are displayed and other slices are omitted. The region of interest may begin at a location other than the top left portion of the picture, and may therefore have addresses that are offset from the start of the picture by a variable value. In order to properly display the sub-image, a splicer may be used to rewrite the slice header(s) for the region of interest to account for this offset. A slicing and tiling scheme that did not require such slice header rewriting would be beneficial. In addition, tile boundaries may not be treated as picture boundaries unless they are collocated with picture boundaries. However, treating tile boundaries as picture boundaries may increase coding efficiency in some cases due to the padding of the boundaries and due to relaxing constraints related to motion vectors that point to samples outside the boundaries in the reference pictures. Also, HEVC may employ a flag named end_of_slice_flag at the end of the coded data for each CTU to indicate whether the end of the slice has been reached. AVC employs this flag at the end of the coded data for each macroblock (MB) for the same purpose. However, coding of this flag is unnecessary and a waste of bits when the last CTU/MB is known through other mechanisms. The present disclosure presents mechanisms to address these and other issues in the video coding arts.

Disclosed herein are various mechanisms to increase the coding efficiency and reduce processing overhead associated with the slicing and tiling schemes discussed above. In an example, an image may be partitioned to contain a single tile. A decoder may perform several operations to determine the tiles in a slice, the tile identifiers (IDs) of those tiles, and entry point offsets indicating the position of such tiles in the bitstream. However, such computations are unnecessary when a slice contains a single tile. Accordingly, an encoder can encode a flag into the bitstream to indicate when a slice contains a single tile. This allows such operations to be omitted at the decoder. Further, this allows corresponding data (e.g., some tile IDs, entry point offsets, etc.) to be omitted from the bitstream, which increases compression and/or coding efficiency. As an example, such a flag may be implemented as a single_tile_in_slice_flag stored in a slice header associated with the slice. Further, a decoder may determine slice boundaries based on tile IDs in some examples. However, this computation is unnecessary when the image contains a single tile. Accordingly, an encoder can encode a flag into the bitstream to indicate when an image contains a single tile. This allows such operations to be omitted at the decoder. Further, this allows corresponding data (e.g., some tile IDs, etc.) to be omitted from the bitstream, which increases compression and/or coding efficiency. As an example, such a flag may be implemented as a single_tile_in_pic_flag stored in a picture parameter set (PPS) associated with the image/picture. These and other examples are described in detail below:

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data prediction data residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
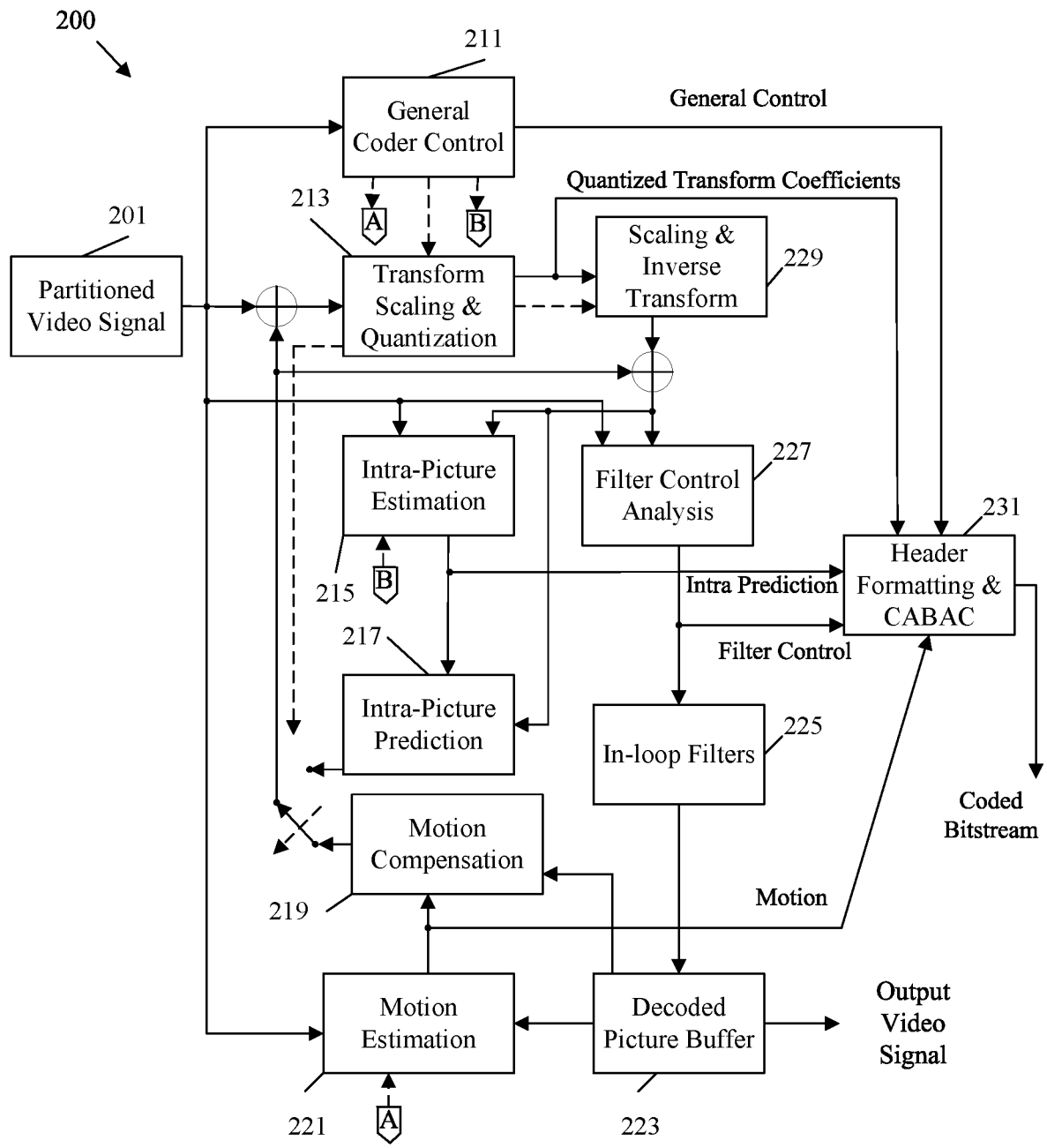
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc, for a current block/frame, and may select the reference blocks, motion vectors, etc, having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
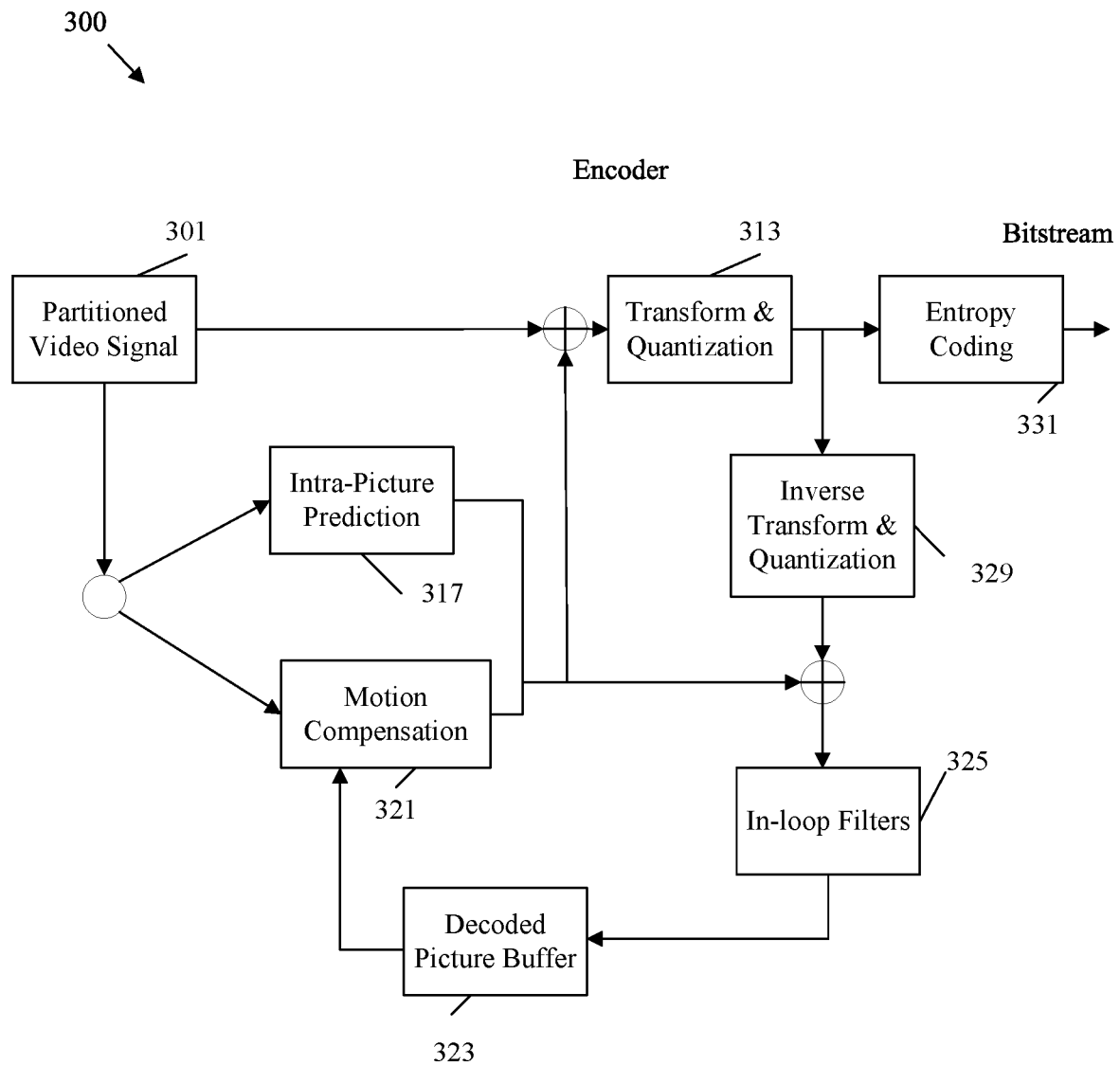
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
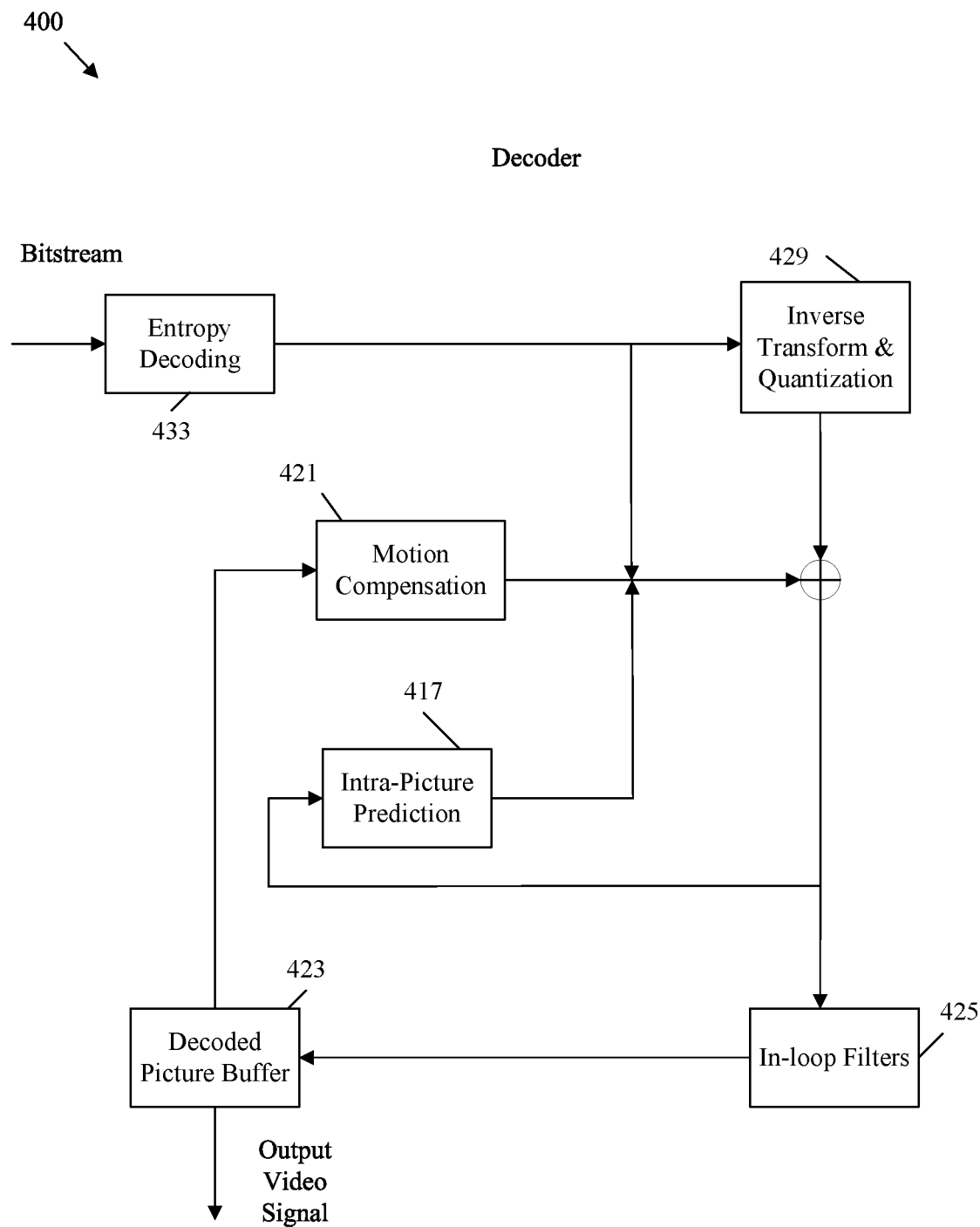
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
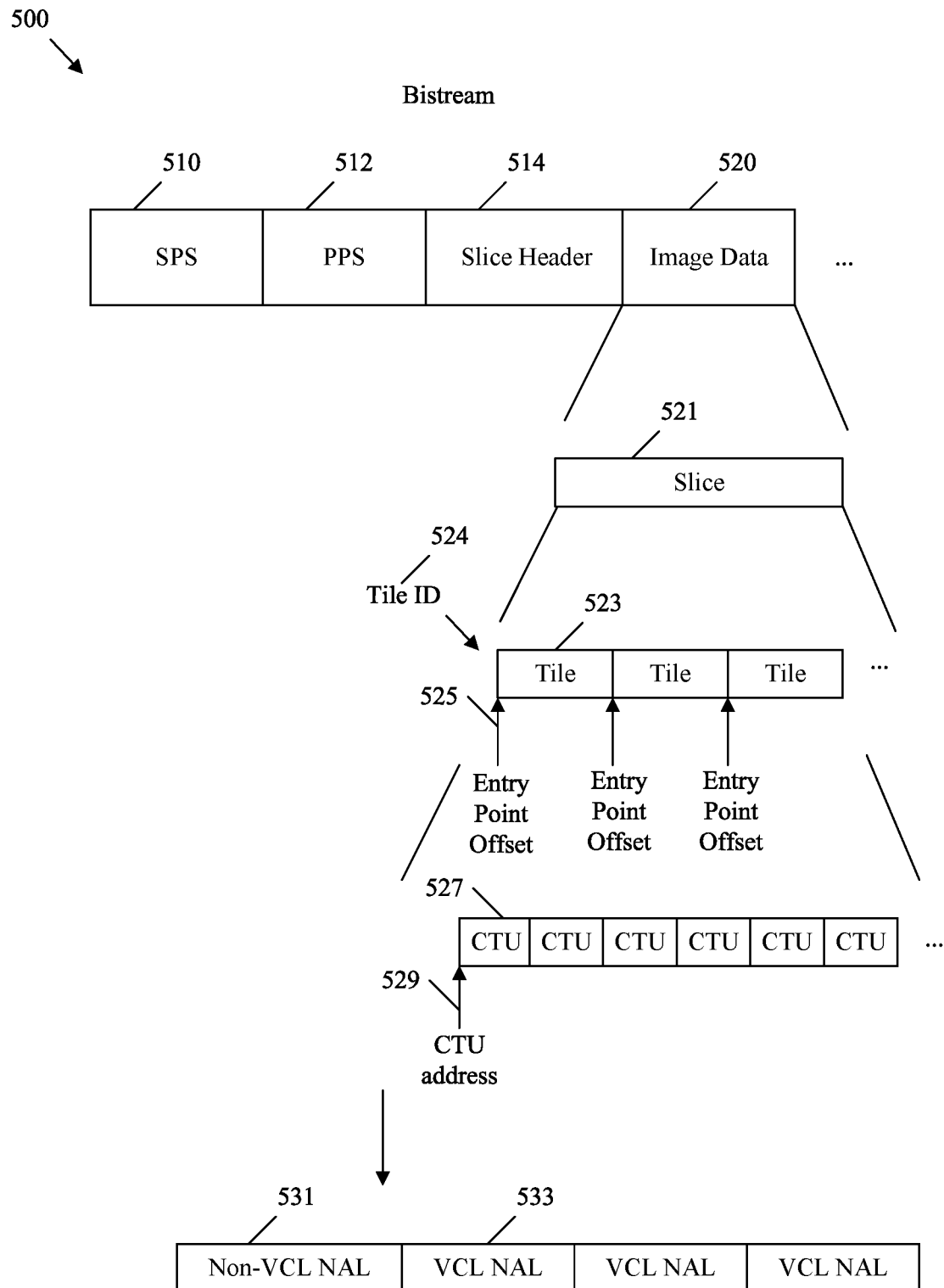
FIG. 5 is a schematic diagram illustrating an example bitstream containing an encoded video sequence.

FIG. 5 is a schematic diagram illustrating an example bitstream 500 containing an encoded video sequence. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, a plurality of slice headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that are specific to each picture. Hence, there may be one PPS 512 per picture in the video sequence. The PPS 512 can indicate coding tools available for slices in corresponding pictures, quantization parameters, offsets, picture specific coding tool parameters (e.g., filter controls), etc. The slice header 514 contains parameters that are specific to each slice in a picture. Hence, there may be one slice header 514 per slice in the video sequence. The slice header 514 may contain slice type information, picture order counts (POCs), reference picture lists, prediction weights, tile entry points, deblocking parameters, etc.

The image data 520) contains video data encoded according to inter-prediction and/or intra-prediction as well as corresponding transformed and quantized residual data. Such image data 520 is sorted according to the partitioning used to partition the image prior to encoding. For example, the image in the image data 520 is divided into slices 521. Each slice 521 is further divided into tiles 523. The tiles 523 are further divided into CTUs 527. The CTUs 527 are further divided into coding blocks based on coding trees. The coding blocks can then be encoded/decoded according to prediction mechanisms. An image/picture can contain one or more slices 521. One slice header 514 is employed per slice 521. Each slice 521 can contain one or more tiles 523, which can then contain a plurality of CTUs 527.

Each slice 521 may be a rectangle defined by a tile 523 at an upper left corner and a tile 523 at a bottom right corner. Unlike in other coding systems, a slice 521 may not traverse the entire width of a picture. A slice 521 is the smallest unit that can be separately displayed by a decoder. Hence, splitting slices 521 into smaller units allows for sub-pictures to be generated in a manner that is granular enough to display desired areas of a picture. For example, in a virtual reality (VR) context, a picture may contain an entire viewable sphere of data, but a user may only view a sub-picture on a head mounted display. Smaller slices 521 allows for such sub-pictures to be separately signaled. A slice 521 is also generally signaled in a separate VCL NAL unit 533. Also, a slice 521 may not allow prediction based on other slices 521, which allows each slice 521 to be coded independently of other slices 521.

The slices 521 are partitioned into an integer number of tiles 523. A tile 523 is a partitioned portion of a slice 521 created by horizontal and vertical boundaries. Tiles 523 may be coded in raster scan order, and may or may not allow prediction based on other tiles 523, depending on the example. Each tile 523 may have a unique tile ID 524 in the picture. A tile ID 524 is a numerical identifier that can be used to distinguish one tile 523 from another. A tile ID 524 may take the value of a tile index that increases numerically in raster scan order. Raster scan order is left to right and top to bottom. The tile IDs 524 may also employ other numerical values. However, the tile ID 524 should always increase in raster scan order to support the computations discussed herein. For example, the boundaries of the slice 521 can be determined according to the tile ID 524 of the tile 523 at the upper left corner of the slice 521 and the tile ID 524 of the tile 523 at the bottom right corner of the slice 521. When the tile ID 524 is a different value from a tile index, a conversion mechanism can be signaled in the bitstream 500, for example in the PPS 512. Further, each tile 523 may be associated with an entry point offset 525. The entry point offset 525 indicates the location of the first bit of coded data associated with the tile 523. The first tile 523 may have an entry point offset 525 of zero and further tiles 523 may each have an entry point offset 525 equal to the number of bits of coded data in preceding tiles 523. As such, the number of the entry point offset 525 can be inferred to be one less than the number of tiles 523.

Tiles 523 are further divided into CTUs 527. A CTU 527 is a sub-portion of a tile 523 that can be further subdivided by a coding tree structure into coding blocks that can be encoded by an encoder and decoded by a decoder. The CTUs 527 are each associated with a CTU address 529. A CTU address 529 denotes the location of a corresponding CTU 527 in the bitstream 500. Specifically, a CTU address 529 may denote the location of a corresponding CTU 527 in a VCL NAL unit 533. In some examples, the CTU addresses 529 for the CTUs 527 may be explicitly signaled, for example in the PPS 512. In other examples, CTU addresses 529 can be derived by the decoder. For example, the CTU addresses 529 can be assigned based on the tile ID 524 of the tile 523 that contains the corresponding CTUs 527. In such a case, the decoder can determine the tiles 523 in a slice 521 based on the tile IDs 524 of the upper left and bottom right tiles 523. The decoder can then use the determined tiles 523 in the slice 521 to determine the number of CTUs 527 in the slice 521. Further, the decoder can use the known tile IDs 524 and the number of CTUs 527 to determine the CTU addresses 529. In addition, as the decoder is aware of the number of CTUs 527, a flag that indicates whether each CTU 527 is the last CTU 527 in a VCL NAL unit 533 can be omitted. This is because the decoder can determine which CTU 527 is the last CTU 527 in a VCL NAL unit 533 by being aware of the number of CTUs 527 in the slice 521, which is contained in the VCL NAL unit 533. However, a padding bit may be placed after the last CTU 527 in a tile 523 in order to assist in distinguishing between tiles 523 in some examples. As can be seen, signaling slice 521 boundaries based on tile IDs 524 can allow the decoder to infer a significant amount of data, which can then be omitted from the bitstream 500 in order to increase coding efficiency.

The bitstream 500 is positioned into VCL NAL units 533 and Non-VCL NAL units 531. A NAL unit is a coded data unit sized to be placed as a payload for a single packet for transmission over a network. A VCL NAL unit 533 is a NAL unit that contains coded video data. For example, each VCL NAL unit 533 may contain one slice 521 of data including corresponding tiles 523, CTUs 527 and coding blocks. A Non-VCL NAL unit 531 is a NAL unit that contains supporting syntax, but does not contain coded video data. For example, a Non-VCL NAL unit 531 may contain the SPS 510, a PPS 512, a slice header 514, etc. As such, the decoder receives the bitstream 500 in discrete VCL NAL unit 533 and Non-VCL NAL units 531. In streaming applications, the decoder may decode a present video data without waiting for the entire bitstream 500 to be received. As such, tile IDs 524, entry point offsets 525, and CTU addresses 529 allow the decoder to correctly locate the video data in the VCL NAL unit 533 for fast decoding, parallel processing, and other video display mechanisms. Accordingly, computing tile IDs 524, entry point offsets 525, and/or CTU addresses 529 allows for the implementation of efficient decoding and display mechanisms while reducing the size of the bitstream 500 and hence increasing coding efficiency.

Figure 6:
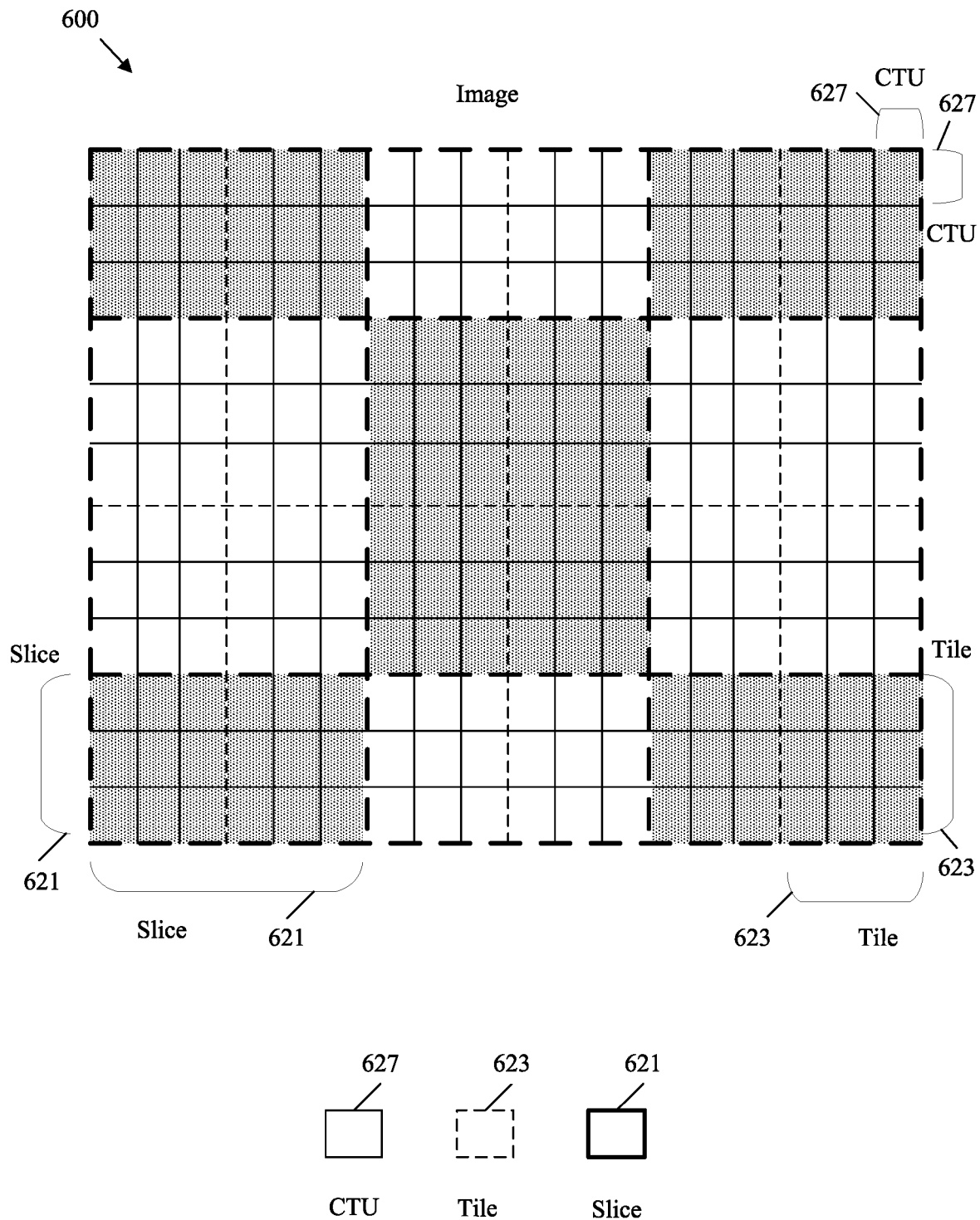
FIG. 6 is a schematic diagram illustrating an example image partitioned for coding.

FIG. 6 is a schematic diagram illustrating an example image 600 partitioned for coding. For example, an image 600 can be encoded in and decoded from a bitstream 500, for example by a codec system 200, an encoder 300, and/or a decoder 400. Further, the image 600 can be partitioned to support encoding and decoding according to method 100.

The image 600 can be partitioned into slices 621, tiles 623, and CTUs 627, which may be substantially similar to slices 521, tiles 523, and CTUs 527, respectively. In FIG. 6, the slices 621 are depicted by bold lines with alternative white backgrounds and hashing to graphically differentiate between slices 621. The tiles 623 are shown by dashed lines. Tile 623 boundaries positioned on slice 621 boundaries are depicted as dashed bold lines and tile 623 boundaries that are not positioned on slice 621 boundaries are depicted as non-bold dashed lines. The CTU 627 boundaries are depicted as solid non-bold lines except for locations where the CTU 627 boundaries are covered by tile 623 or slice 621 boundaries. In this example, image 600 includes nine slices 621, twenty four tiles 623, and two hundred sixteen CTUs 627.

As shown, a slice 621 is a rectangle with boundaries that may be defined by the included tiles 623. The slice 621 may not extend across the entire width of the image 600. Tiles 623 can be generated in the slices 621 according to rows and columns. CTUs 627 can then be partitioned from the tiles 623 to create image 600 partitions suitable to be subdivided into coding blocks for coding according to inter-prediction and/or intra-prediction.

By employing the forgoing, video coding systems can be improved. For example, slices are designed such that CTUs contained in a slice may not be simply a set of CTUs of a picture following a CTU raster scan order of the picture. But rather a slice is defined as a set of CTUs that cover a rectangular region of a picture. Further, each slice is in its own NAL unit. Also, the addresses of the CTUs contained in a slice can be signaled by signaling, in the slice header, the CTU addresses in raster scan order of the top-left and bottom-right CTUs in the slice. Further, slices are designed to contain and only contain a set of complete tiles covering a rectangular region of a picture. Each slice is in its own NAL unit. This way, the purpose of having more than one slice may be to put a set of tiles covering a rectangular region of a picture into a NAL unit. In some cases, there are one or more slices in a picture, and each of these slices can contain a set of complete tiles covering a rectangular region. There may also be one other slice in the picture covering the rest of the tiles of the picture. The region covered by this slice may be a rectangular region with a hole that is covered by other slices. For example, for region of interest purposes, a picture may contain two slices in which one slice contains a set of complete tiles covering the region of interest and the other slice contains the remaining tiles of the picture.

The addresses of the CTUs contained in a slice may be explicitly or implicitly signaled by the tile IDs of the tiles contained in the slice. For efficient signaling, only the tile IDs of the top-left and the bottom-right tiles may be signaled in some examples. For further improved signaling efficiency, a flag indicating whether the slice contains a single tile can signaled, and if yes, only one tile ID may be signaled. In other cases, all tile IDs contained in a slice are signaled. In some examples, tile ID values are assigned to be the same as the tile index within the picture. The length, in bits, for explicitly signaling tile IDs in a slice header for derivation of the addresses of the CTUs contained in a slice, can be derived according to the number of tiles in the picture (e.g., cell of log two of number of tiles in a picture). The number of tiles in the picture can be either explicitly signaled in a parameter set or derived per the tile configuration signaled in a parameter set. In some examples, the length, in bits, for explicitly signaling tile IDs in a slice header for derivation of the addresses of the CTUs contained in a slice can be signaled in a parameter set. In some examples, the number of entry points, which is equal to the number of tiles in the slice minus 1, is derived and is not signaled in the slice header. In another example, signaling of a flag for each CTU indicating whether the CTU is the end of a slice is avoided.

In some examples, slices and tiles are designed such that rewriting of the slice headers is not needed when extracting a set of tiles, such as motion constrained tile sets (MCTSs), from a bitstream to create a conforming sub-bitstream. For example, the tile ID may be explicitly signaled for each tile in the parameter set in which the tile configuration is signaled. The tile IDs are each unique within a picture. Tile IDs may not be continuous within a picture. However, tile IDs should be organized in increasing order (e.g., monotonously increasing) in the direction of the tile raster scan of a picture. With this, the decoding order of slices in a picture can be restricted to be in increasing value of the tile ID of the top-left tile. When the tile ID is not explicitly signaled and inferred to be the same as tile index, the following can be used for signaling tile ID values in slice headers. A flag indicating whether the slice is the first slice of the picture can be signaled. When the flag indicating that the slice is the first slice of the picture, the signaling of the tile ID of the top left tile of the slice can be omitted as it can be inferred to be the tile with lowest tile index (e.g., tile index zero—assuming tile index starts from zero).

In another example, a picture may contain zero, one, or more MCTSs. An MCTS may contain one or more tiles. When a tile in a slice is part of an MCTS, the MCTS is constrained so that all tiles in the slice are part of the same MCTS. The slice may be further constrained so that the tile configuration for all pictures containing tiles of an MCTS is the same regarding the positions and sizes of the tiles within the MCTS. In some examples, the slice is constrained such that an MCTS is exclusively contained in a slice. This has two consequences. In this case, each MCTS is in a separate NAL unit. Further, each MCTS is in rectangular shape.

The signaling of MCTSs may be as follows. A flag can be signaled in a slice header to indicate whether the slice contains NAL units with an MCTS in the access unit containing the corresponding slice. Other supporting information for MCTS (e.g., profile, tier and level information of sub-bitstream resulting from extracting the MCTS) is signaled in an SEI message. Alternatively, both the flag indication and supporting information of MCTS can be signaled in an SEI message. To enable signaling of treatment of MCTS boundaries as picture boundaries a syntax element indicating whether all tile boundaries are treated the same as picture boundaries is signaled, for example in the parameter set wherein tile configuration is signaled. In addition, a syntax element indicating whether all slice boundaries of a slice are treated the same as picture boundaries may be signaled in the slice header, for example when other syntax elements do not indicate that all tile boundaries are treated the same as picture boundaries.

A syntax element indicating whether the in-loop filtering operations may be applied across each tile boundary may be signaled only when syntax does not otherwise indicate that all tile boundaries are treated the same as picture boundaries. In this case, treating a tile boundary as picture boundary indicates that, among other aspects, no in-loop filtering operations may be applied across each tile boundary. In other examples, a syntax element indicating whether the in-loop filtering operations may be applied across each tile boundary is signaled independently of indications of whether all tile boundaries are treated the same as picture boundaries. In this case, treating a tile boundary as picture boundary indicates that in-loop filtering operations may still be applied across each tile boundary.

In some examples, an MCTS boundary is treated as a picture boundary. Further, the syntax element in the slice header that indicates whether the slice boundary is treated the same as the picture boundary can also be made conditional to the flag that indicates whether the slice contains MCTS. In some cases, the value of a flag indicating that the MCTS boundary is to be treated as a picture boundary can be inferred when the flag in the slice header indicates the slice contains MCTS.

When the boundaries of a tile or slice are indicated to be treated as picture boundaries, the following applies. In the derivation process for temporal luma motion vector prediction, the right and bottom picture boundary positions used in the process, indicated by pic_height_in_luma_samples−1 and pic_width_in_luma_samples−1, respectively, are replaced with the right and the bottom boundary positions, respectively, of the tile or slice, in units of luma samples. In the luma sample interpolation process, the left, right, top, and bottom picture boundary positions used in the process, indicated by 0, pic_height_in_luma_samples−1, 0, pic_width_in_luma_samples−1, respectively, are replaced with the left, right, top, and bottom boundary positions, respectively, of the tile or slice, in units of luma samples, respectively. In the chroma sample interpolation process, the left, right, top, and bottom picture boundary positions used in the process, indicated by 0, pic_height_in_luma_samples/SubWidthC−1, 0, pic_width_in_luma_samples/SubWidthC−1, respectively, are replaced with the left, right, top, and bottom boundary positions, respectively, of the tile or slice, in units of chroma samples, respectively.

The preceding mechanisms can be implemented as follows. A slice is defined as an integer number of tiles that cover a rectangular region of a picture and that are exclusively contained in a single NAL unit. A slice header is defined as a part of a coded slice containing the data elements pertaining to all tiles represented in the slice. A tile is defined as a rectangular region of CTUs within a particular tile column and a particular tile row in a picture. A tile column is defined as a rectangular region of CTUs having a height equal to the height of the picture and a width specified by syntax elements in the picture parameter set. A tile row is defined as a rectangular region of CTUs having a height specified by syntax elements in the picture parameter set and a width equal to the width of the picture. A tile scan is defined as a specific sequential ordering of CTUs partitioning a picture in which the CTUs are ordered consecutively in CTU raster scan in a tile whereas tiles in a picture are ordered consecutively in a raster scan of the tiles of the picture.

This section specifies how a picture is partitioned into slices and tiles. Pictures are divided into slices and tiles. A slice is a sequence of tiles that cover a rectangular region of a picture. A tile is a sequence of CTUs that cover a rectangular region of a picture.

When a picture is coded using three separate color planes (separate_colour_plane_flag is equal to 1), a slice contains only CTUs of one color component being identified by the corresponding value of colour_plane_id, and each color component array of a picture includes slices having the same colour_plane_id value. Coded slices with different values of colour_plane_id within a picture may be interleaved with each other under the constraint that for each value of colour_plane_id, the coded slice NAL units with that value of colour_plane_id shall be in the order of increasing CTU address in tile scan order for the first CTU of each coded slice NAL unit. It should be noted that when separate_colour_plane_flag is equal to 0), each CTU of a picture is contained in exactly one slice. When separate_colour_plane_flag is equal to 1, each CTU of a color component is contained in exactly one slice (e.g., information for each CTU of a picture is present in exactly three slices and these three slices have different values of colour_plane_id).

The following divisions of processing elements of this specification form spatial or component-wise partitioning: the division of each picture into components; the division of each component into CTBs; the division of each picture into tile columns; the division of each picture into tile rows; the division of each tile column into tiles; the division of each tile row into tiles; the division of each tile into CTUs; the division of each picture into slices; the division of each slice into tiles; the division of each slice into CTUs; the division of each CTU into CTBs; the division of each CTB into coding blocks, except that the CTBs are incomplete at the right component boundary when the component width is not an integer multiple of the CTB size and the CTBs are incomplete at the bottom component boundary when the component height is not an integer multiple of the CTB size; the division of each CTU into coding units, except that the CTUs are incomplete at the right picture boundary when the picture width in luma samples is not an integer multiple of the luma CTB size and the CTUs are incomplete at the bottom picture boundary when the picture height in luma samples is not an integer multiple of the luma CTB size; the division of each coding unit into transform units; the division of each coding unit into coding blocks; the division of each coding block into transform blocks; and the division of each transform unit into transform blocks.

Inputs into the derivation process for neighboring block availability are the luma location (xCurr, yCurr) of the top-left sample of the current block relative to the top-left luma sample of the current picture, and the luma location (xNbY, yNbY) covered by a neighboring block relative to the top-left luma sample of the current picture. The outputs of this process are the availability of the neighboring block covering the location (xNbY, yNbY), denoted as availableN. The neighboring block availability availableN is derived as follows. If one or more of the following conditions are true, availableN is set equal to false. The top_left_tile_id of the slice containing the neighboring block differs in value from the top_left_tile_id of the slice containing the current block or the neighboring block is contained in a different tile than the current block.

The CTB raster and tile scanning process is as follows. The list ColWidth[i] for i ranging from 0 to num_tile_columns_minus1, inclusive, specifying the width of the i-th tile column in units of CTBs, is derived as follows.
    if(uniform_tile_spacing_flag)
        for(i=0; i<=num_tile_columns_minus1; i++)
            ColWidth[i]=((i+1)*PicWidthInCtbsY)/
            (num_tile_columns_minus1+1)−
            (i*PicWidthInCtbsY)/
            (num_tile_columns_minus+1)
    else {
        ColWidth[num_tile_columns_minus1]
            =PicWidthInCtbsY (6-1)

for(i=0; i<num_tile_columns_minus1; i++){
            ColWidth[i]=tile_column_width_minus1[i]+1
            ColWidth[num_tile_columns_minus1]−=ColWidth[i]
        }
    }

The list RowHeight[j] for j ranging from 0 to num_tile_rows_minus1, inclusive, specifying the height of the j-th tile row in units of CTBs, is derived as follows.
    if(uniform_tile_spacing_flag)
        for(j=0; j<=num_tile_rows_minus1; j++)
            RowHeight[j]=((j+1)*PicHeightInCtbsY)/(num_tile_rows_minus1+1
    )−
    (j*PicHeightInCtbsY)/(
    num_tile_rows_minus1+1)
    else {
        RowHeight[num_tile_rows_minus1]=PicHeightInCtbsY (6-2)
        for(j=0; j<num_tile_rows_minus1; j++) {
            RowHeight[j]=tile_row_height_minus1[j]+1
            RowHeight[num_tile_rows_minus1]−=RowHeight[j]
        }
    }

The list ColBd[i] for i ranging from 0 to num_tile_columns_minus1+1, inclusive, specifying the location of the i-th tile column boundary in units of CTBs, is derived as follows:
    for(ColBd[0]=0, i=0; i<=num_tile_columns_minus1; i++)
        ColBd[i+1]=ColBd[i]+ColWidth[i] (6-3)

The list RowBd[j] for j ranging from 0 to num_tile_rows_minus1+1, inclusive, specifying the location of the j-th tile row boundary in units of CTBs, is derived as follows:
    for(RowBd[0]=0, j=0; j<=num_tile_rows_minus1; j++)
        RowBd[j+1]=RowBd[j]+RowHeight[j] (6-4)

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, is derived as follows:
    for(ctbAddrRs=0; ctbAddrRs<PicSizeInCtbsY; ctbAddrRs++) {
        tbX=ctbAddrRs % PicWidthInCtbsY
        tbY=ctbAddrRs/Pic WidthInCtbsY
        for(i=0; i<=num_tile_columns_minus1; i++)
            if(tbX>=ColBd[i])
                tileX=i
        for(j=0; j<=num_tile_rows_minus1; j++) (6-5)
            if(tbY>=RowBd[j])
                tileY=j
        CtbAddrRsToTs[ctb AddrRs]=0
        for(i=0; i<tileX; i++)
            CtbAddrRsToTs[ctbAddrRs]+=RowHeight[tileY]*ColWidth[i]
        for(j=0; j<tileY; j++)
            CtbAddrRsToTs[ctbAddrRs]+
                =PicWidthInCtbsY*RowHeight[j]
        CtbAddrRsToTs[ctbAddrRs]+=(tbY−RowBd[tileY]
    )*ColWidth[tileX]+tbX−ColBd[tileX]
    }

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

```
for(ctbAddrRs=0;     ctbAddrRs<PicSizeInCtbsY;     ctb
   AddrRs++) (6-6)
   CtbAddrTsToRs[CtbAddrRsToTs[ctbAddrRs]]=ct-
      bAddrRs
```

The list TileId[ctbAddrTs] for ctbAddrTs ranging from 0 to PicSizeInCtbsY−1, inclusive, specifying the conversion from a CTB address in tile scan to a tile ID, is derived as follows:

```
for(j = 0, tileIdx = 0; j <= num_tile_rows_minus1; j++)         (6-7)
   for( i = 0; i <= num_tile_columns_minus1; i++, tileIdx++ )
      for( y = RowBd[ j ]; y < RowBd[ j + 1 ]; y++ )
         for( x = ColBd[ i ]; x < ColBd[ i + 1 ]; x++)
            TileId[ CtbAddrRsToTs[ y * PicWidthInCtbsY+ x ] ] =
               explicit_tile_id_flag ? tile_id_val[ i ][ j ] : tileIdx
```

The list NumCtusInTile[tileIdx] for tileIdx ranging from 0 to PicSizeInCtbsY−1, inclusive, specifying the conversion from a tile index to the number of CTUs in the tile, is derived as follows:

```
for(j=0, tileIdx=0; j<=num_tile_rows_minus1; j++)
   for(i=0; i<=num_tile_columns_minus1; i++, tileIdx++)         (6-8)
      NumCtusInTile[tileIdx]=ColWidth[i]*RowHeight[j]
```

The set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile are derived as follows:

```
for(ctbAddrTs=0,     tileIdx=0,     tileStartFlag=1;
   ctbAddrTs<PicSizeInCtbsY; ctbAddrTs++)
{
   if(tileStartFlag) {
      TileIdToIdx[TileId[ctbAddrTs]]=tileIdx
      FirstCtbAddrTs[tileIdx]=ctbAddrTs   (6-9)
      tileStartFlag=0
   }
   tileEndFlag=ctbAddrTs==PicSizeInCtbsY−1||TileId
      [ctbAddrTs+1]!=
TileId[ctbAddrTs]
   if(tileEndFlag) {
      tileIdx++
      tileStartFlag=1
   }
}
```

The values of ColumnWidthInLumaSamples[i], specifying the width of the i-th tile column in units of luma samples, are set equal to ColWidth[i]<<CtbLog2SizeY for i ranging from 0 to num_tile_columns_minus1, inclusive. The values of RowHeightInLumaSamples[j], specifying the height of the j-th tile row in units of luma samples, are set equal to RowHeight[j]<<CtbLog 2SizeY for j ranging from 0 to num_tile_rows_minus1, inclusive.

The picture parameter set RBSP syntax is as follows:

TABLE 1

| | Descriptor |
|---|---|
| pic_parameter_set_rbsp( ) { | |
| pps_pic_parameter_set_id | ue(v) |
| pps_seq_parameter_set_id | ue(v) |
| transform_skip_enabled_flag | u(1) |

TABLE 1-continued

| | Descriptor |
|---|---|
| single_tile_in_pic_flag | u(1) |
| if( !single_tile_in_pic_flag ) { | |
| num_tile_columns_minus1 | ue(v) |
| num_tile_rows_minus1 | ue(v) |
| } | |
| tile_id_len_minus1 | ue(v) |
| explicit_tile_id_flag | u(1) |
| if( explicit_tile_id_flag ) | |
| for( i = 0; i <= num_tile_columns_minus1; i++ ) | |
| for( j = 0; j <= num_tile_rows_minus1; j++ ) | |
| tile_id_val[ i ][ j ] | u(v) |
| if( !single_tile_in_pic_flag ) { | |
| uniform_tile_spacing_flag | u(1) |
| if( !uniform_tile_spacing_flag ) { | |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |
| tile_boundary_treated_as_pic_boundary_flag | u(1) |
| if( !tile_boundary_treated_as_pic_boundary_flag ) | |
| loop_filter_across_tiles_enabled_flag | u(1) |
| } | |
| rbsp_trailing_bits( ) | |
| } | |

The slice header syntax is changed as follows.

TABLE 2

| | Descriptor |
|---|---|
| slice_header( ) { | |
| slice_pic_parameter_set_id | ue(v) |
| single_tile_in_slice_flag // Same note as below | u(1) |
| top_left_tile_id // Note that this is needed even when there | u(v) |
| is only one tile in the picture to enable extraction of a | |
| single motion-constrained tile to be a conforming bitstream | |
| without the need of changing the slice header. | |
| if( !single_tile_in_slice_flag ) | |
| bottom_right_tile_id | u(v) |
| slice_type | ue(v) |
| if ( slice_type != I ) | |
| log2_diff_ctu_max_bt_size | ue(v) |
| dep_quant_enabled_flag | u(1) |
| if( !dep_quant_enabled_flag ) | |
| sign_data_hiding_enabled_flag | u(1) |
| if( !tile_boundary_treated_as_pic_boundary_flag ) | |
| slice_boundary_treated_as_pic_boundary_flag | |
| if( !single_tile_in_slice_flag ) { | |
| offset_len_minus1 | ue(v) |
| for( i = 0; i < NumTilesInSlice − 1; i++ ) | |
| entry_point_offset_minus1[ i ] | u(v) |
| } | |
| byte_alignment( ) | |
| } | |

The slice_data( ) syntax is as follows:

TABLE 3

| | Descriptor |
|---|---|
| slice_data( ) { | |
| tileIdx = TileIdToIdx[ top_left_tile_id ] | |
| for( j = 0; j < NumTileRowsInSlice; j++, | |
| tileIdx += num_tile_columns_minus1 + 1 ) { | |
| for( i = 0, CurrTileIdx = tileIdx; | |
| i < NumTileColumnsInSlice; i++, CurrTileIdx++ ) { | |
| ctbAddrInTs = FirstCtbAddrTs[ CurrTileIdx ] | |
| for( k = 0; k < NumCtusInTile[ CurrTileIdx ]; | |
| k++, ctbAddrInTs++ ) { | |
| CtbAddrInRs = CtbAddrTsToRs[ ctbAddrInTs ] | |
| coding_tree_unit( ) | |
| } | |

TABLE 3-continued

| | Descriptor |
|---|---|
| end_of_tile_one_bit /* equal to 1 */ <br> if( i < NumTileRowsInSlice − 1 \|\| j < NumTileColumnsInSlice − 1 ) <br>     byte_alignment( ) <br> } <br> } <br> } | ae(v) |

The Picture parameter set RBSP semantics are as follows. The single_tile_in_pic_flag is set equal to one to specify that there is only one tile in each picture referring to the PPS. The single_tile_in_pic_flag is set equal to zero to specify that there is more than one tile in each picture referring to the PPS. Bitstream conformance may require that the value of single_tile_in_pic_flag shall be the same for all PPSs that are activated within a coded video sequence (CVS). The num_tile_columns_minus1 plus 1 specifies the number of tile columns partitioning the picture. The num_tile_columns_minus1 shall be in the range of zero to PicWidthInCtbsY−1, inclusive. When not present, the value of num_tile_columns_minus1 is inferred to be equal to zero. The num_tile_rows_minus1 plus 1 specifies the number of tile rows partitioning the picture. The num_tile_rows_minus1 shall be in the range of zero to PicHeightInCtbsY−1, inclusive. When not present, the value of num_tile_rows_minus1 is inferred to be equal to zero. The variable NumTilesInPic is set equal to (num_tile_columns_minus1+1)*(num_tile_rows_minus1+1).

When single_tile_in_pic_flag is equal to zero, NumTilesInPic shall be greater than zero. The tile_id_len_minus1 plus 1 specifies the number of bits used to represent the syntax element tile_id_val[i][j], when present, in the PPS and the syntax elements top_left_tile_id and bottom_right_tile_id, when present, in slice headers referring to the PPS. The value of tile_id_len_minus1 shall be in the range of Ceil(Log 2(NumTilesInPic)) to 15, inclusive. The explicit_tile_id_flag is set equal to one to specify that tile ID for each tile is explicitly signaled. The explicit_tile_id_flag is set equal to zero to specify that the tile IDs are not explicitly signaled. The tile_id_val[i][j] specifies the tile ID of the tile of the i-th tile column and the j-th tile row. The length of tile_id_val[i][j] is tile_id_len_minus1+1 bits.

For any integer m in the range of zero to num_tile_columns_minus1, inclusive, and any integer n in the range of zero to num_tile_rows_minus1, inclusive, tile_id_val[i][j] shall not be equal to tile_id_val[m][n] when i is not equal to m or j is not equal to n, and tile_id_val[i][j] shall be less than tile_id_val[m][n] when j*(num_tile_columns_minus1+1)+i is less than n*(num_tile_columns_minus1+1)+m. The uniform_tile_spacing_flag is set equal to one to specify that tile column boundaries and likewise tile row boundaries are distributed uniformly across the picture. The uniform_tile_spacing_flag is set equal to zero to specify that tile column boundaries and likewise tile row boundaries are not distributed uniformly across the picture but signaled explicitly using syntax the elements tile_column_width_minus1[i] and tile_row_height_minus1[i]. When not present, the value of uniform_tile_spacing_flag is inferred to be equal to 1. The tile_column_width_minus1 [i] plus 1 specifies the width of the i-th tile column in units of CTBs. The tile_row_height_minus1 [i] plus 1 specifies the height of the i-th tile row in units of CTBs.

The following variables are derived by invoking the CTB raster and tile scanning conversion process: the list ColWidth[i] for i ranging from 0 to num_tile_columns_minus1, inclusive, specifying the width of the i-th tile column in units of CTBs; the list RowHeight[j] for j ranging from 0 to num_tile_rows_minus1, inclusive, specifying the height of the j-th tile row in units of CTBs; the list ColBd[i] for i ranging from 0 to num_tile_columns_minus1+1, inclusive, specifying the location of the i-th tile column boundary in units of CTBs; the list RowBd[j] for j ranging from 0 to num_tile_rows_minus1+1, inclusive, specifying the location of the j-th tile row boundary in units of CTBs; the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan: the list CtbAddrTsToRs [ctbAddrTs] for ctbAddrTs ranging from 0 to PicSizeInCtbsY−1, inclusive, specifying the conversion from a CTB address in the tile scan to a CTB address in the CTB raster scan of a picture: the list TileId[ctbAddrTs] for ctbAddrTs ranging from 0 to PicSizeInCtbsY−1, inclusive, specifying the conversion from a CTB address in tile scan to a tile ID: the list NumCtusInTile[tileIdx] for tileIdx ranging from 0) to PicSizeInCtbsY−1, inclusive, specifying the conversion from a tile index to the number of CTUs in the tile; the set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile: the lists ColumnWidthInLumaSamples [i] for i ranging from 0 to num_tile_columns_minus1, inclusive, specifying the width of the i-th tile column in units of luma samples:and the list Row HeightInLumaSamples[j] for j ranging from 0 to num_tile_rows_minus1, inclusive, specifying the height of the j-th tile row in units of luma samples.

The values of ColumnWidthInLumaSamples[i] for i ranging from 0 to num_tile_columns_minus1, inclusive, and Row HeightInLumaSamples[j] for j ranging from 0 to num_tile_rows_minus1, inclusive, shall all be greater than 0. The tile_boundary_treated_as_picture_boundary_flag is set equal to one to specify that each tile boundary is treated the same as the picture boundary in the decoding process for pictures referring to the PPS. The tile_boundary_treated_as_picture_boundary_flag is set equal to zero to specify that each tile boundary may or may not be treated the same as the picture boundary in the decoding process for pictures referring to the PPS. When not present, the value of tile_boundary_treated_as_picture_boundary_flag is inferred to be equal to one. The loop_filter_across_tiles_enabled_flag is set equal to one to specify that in-loop filtering operations may be performed across tile boundaries in pictures referring to the PPS. The loop_filter_across_tiles_enabled_flag is set equal to zero to specify that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to zero.

The slice header semantics are as follows. When present, the value of the slice header syntax element slice_pic_parameter_set_id shall be the same in all slice headers of a coded picture. The slice_pic_parameter_set_id specifies the value of pps_pic_parameter_set_id for the PPS in use. The value of slice_pic_parameter_set_id shall be in the range of 0 to 63, inclusive. The single_tile_in_slice_flag is set equal to one to specify that there is only one tile in the slice. The single_picture_in_pic_flag is set equal to zero to specify that there is more than one tile in the slice. The top_left_tile_id specifies the tile ID of the tile located at the top-left corner of the slice. The length of top_left_tile_id is tile_id_len_minus1+1 bits. The value of top_left_tile_id shall not be equal to the value of top_left_tile_id of any other coded slice NAL unit of the same coded picture. When there is more than one slice in a picture, the decoding order of the slices in the picture shall be in increasing value of top_left_tile_id. The bottom_right_tile_id specifies the tile ID of the tile located at the bottom-right corner of the slice. The length of bottom_right_tile_id is tile_id_len_minus1+1 bits. When not present, the value of bottom_right_tile_id is inferred to be equal to top_left_tile_id.

The variables NumTileRowsInSlice, NumTileColumnsInSlice, and NumTilesInSlice are derived as follows:
deltaTileIdx=TileIdToIdx[bottom_right_tile_id]−TileIdToIdx[top_left_tile_id]
NumTileRowsInSlice=(deltaTileIdx/(num_tile_columns_minus1+1))+1 (7-25)
NumTileColumnsInSlice=(deltaTileIdx % (num_tile_columns_minus1+1))+1
NumTilesInSlice=NumTileRowsInSlice*NumTileColumnsInSlice The slice_type specifies the coding type of the slice according to table 4.

TABLE 4

| slice_type | Name of slice_type |
|---|---|
| 0 | B (B slice) |
| 1 | P (P slice) |
| 2 | I (I slice) |

When nal_unit_type has a value in the range of TBD, inclusive, e.g., the picture is an Intra Random Access Picture (IRAP) picture, slice_type shall be equal to two. The log 2_diff_ctu_max_bt_size specifies the difference between the luma CTB size and the maximum luma size (width or height) of a coding block that can be split using a binary split. The value of log 2_diff_ctu_max_bt_size shall be in the range of zero to CtbLog 2SizeY−MinCbLog 2SizeY, inclusive. When log 2_diff_ctu_max_bt_size is not present, the value of log 2_diff_ctu_max_bt_size is inferred to be equal to two.

The variables MinQtLog 2SizeY, MaxBtLog 2SizeY, MinBtLog 2SizeY, MaxTtLog 2SizeY, MinTtLog 2SizeY, MaxBtSizeY, MinBtSizeY, MaxTtSizeY, MinTtSizeY and MaxMttDepth are derived as follows:
MinQtLog 2SizeY=(slice_type==1)? MinQtLog 2SizeIntraY: MinQtLog 2SizeInterY
(7-26)
MaxBtLog 2SizeY=CtbLog 2SizeY−log 2_diff_ctu_max_bt_size (7-27)
MinBtLog 2SizeY=MinCbLog 2SizeY (7-28)
MaxTtLog 2SizeY=(slice_type==I)? 5:6 (7-29)
MinTtLog 2SizeY=MinCbLog 2SizeY (7-30)
MinQtSizeY=1<<MinQtLog 2SizeY (7-31)
MaxBtSizeY=1<<MaxBtLog 2SizeY (7-32)
MinBtSizeY=1<<MinBtLog 2SizeY (7-33)
MaxTtSizeY=1<<MaxTtLog 2SizeY (7-34)
MinTtSizeY=1<<MinTtLog 2SizeY (7-35)
MaxMttDepth=(slice_type==1)? max_mtt_hierarchy_depth_intra_slices:
max_mtt_hierarchy_depth_inter_slices (7-36)

The dep_quant_enabled_flag is set equal to zero to specify that dependent quantization is disabled. The dep_quant_enabled_flag is set equal to one to specify that dependent quantization is enabled. The sign_data_hiding_enabled_flag is set equal to zero to specify that sign bit hiding is disabled. The sign_data_hiding_enabled_flag is set equal to one to specify that sign bit hiding is enabled. When sign_data_hiding_enabled_flag is not present, it is inferred to be equal to zero. The slice_boundary_treated_as_pic_boundary_flag is set equal to one to specify that each slice boundary of the slice is treated the same as picture boundary in the decoding process. The slice_boundary_treated_as_pic_boundary_flag equal to zero specifies that each tile boundary may or may not be treated the same as picture boundary in the decoding process. When not process, present, the value of slice_boundary_treated_as_pic_boundary_flag is inferred to be equal to one. The offset_len_minus1 plus 1 specifies the length, in bits, of the entry_point_offset_minus1[i] syntax elements. The value of offset_len_minus1 shall be in the range of 0 to 31, inclusive. The entry_point_offset_minus1[i] plus 1 specifies the i-th entry point offset in bytes, and is represented by offset_len_minus1 plus 1 bits. The slice data that follow the slice header consists of NumTilesInSlice subsets, with subset index values ranging from 0 to NumTilesInSlice−1, inclusive. The first byte of the slice data is considered byte zero. When present, emulation prevention bytes that appear in the slice data portion of the coded slice NAL unit are counted as part of the slice data for purposes of subset identification.

Subset zero include bytes zero to entry_point_offset_minus1[0], inclusive, of the coded slice segment data, subset k, with k in the range of 1 to NumTilesInSlice−2, inclusive, includes bytes firstByte[k] to lastByte[k], inclusive, of the coded slice data with firstByte[k] and lastByte[k] defined as:

$$firstByte[k] = \sum_{n=1}^{k}(entry\_point\_offset\_minus1[n-1]+1) \quad (7-37)$$

lastByte[k]=firstByte[k]+entry_point_offset_minus1 [k] (7-38)

The last subset (with subset index equal to NumTilesInSlice−1) includes the remaining bytes of the coded slice data. Each subset shall include all coded bits of all CTUs in the slice that are within the same tile.

The general slice data semantics are as follows: The end_of_tile_one_bit shall be equal to one. For each tile, the variables LeftBoundaryPos, TopBoundaryPos, RightBoundaryPos and BotBoundary Pos are derived as follows. If tile_boundary_treated_as_pic_boundary_flag is equal to true, the following applies:
tileColIdx=CurrTileIdx/(num_tile_columns_minus1+1) (7-39)
tileRowIdx=CurrTileIdx % (num_tile_columns_minus1+1) (7-40)
LeftBoundary Pos=ColBd[tileColIdx]<<CtbLog 2SizeY (7-41)
RightBoundaryPos=((ColBd[tileColIdx]+ColWidth[tileColIdx])<<CtbLog 2SizeY)−1 (7-42)
TopBoundary Pos=Row Bd[tileRowIdx]<<CtbLog 2SizeY (7-43)
BotBoundary Pos=((RowBd[tileRowIdx]+RowHeight[tileRowIdx])<<CtbLog 2SizeY)−1 (7-44)

Otherwise if slice_boundary_treated_as_pic_boundary_flag is equal to true, the following applies:
sliceFirstTileColIdx=TileIdToIdx[top_left_tile_id]/(num_tile_columns_minus1+1)

(7-45)
sliceFirstTileRowIdx=TileIdToIdx[top_left_tile_id] % (num_tile_columns_minus1+1)
(7-46)
sliceLastTileColIdx=TileIdToIdx[bottom_right_tile_id]/(num_tile_columns_minus1+1)
(7-47)
sliceLastTileRowIdx=TileIdToIdx[bottom_right_tile_id] % (num_tile_columns_minus1+1
) (7-48)
LeftBoundaryPos=ColBd[sliceFirstTileColIdx]<<CtbLog 2SizeY (7-49)
RightBoundaryPos=((ColBd[sliceLastTileColIdx]+ColWidth[sliceLastTileColIdx])<<CtbLog 2SizeY)−1 (7-50)
TopBoundary Pos=RowBd[sliceFirstTileRowIdx]<<CtbLog 2SizeY (7-51)
BotBoundaryPos=((RowBd[sliceLastTileRowIdx]+RowHeight[sliceLastTileRowIdx])<<CtbLog 2SizeY)−1 (7-52)

Otherwise (slice_boundary_treated_as_pic_boundary_flag is equal to FALSE), the following applies:
LeftBoundaryPos=0 (7-53)
RightBoundaryPos=pic_width_in_luma_samples−1 (7-54)
TopBoundaryPos=0 (7-55)
BotBoundaryPos=pic_height_in_luma_samples−1 (7-56)

The derivation process for temporal luma motion vector prediction is as follows. If yCb>>CtbLog 2SizeY is equal to yColBr>>CtbLog 2SizeY, yColBr is less than pic_height_in_luma_samples, and xColBr is less than pic_width_in_luma_samples, the following applies:

The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX, and control parameter controlParaFlag set equal to 0 as inputs, and the output is assigned to mvLXCol and availableFlagLXCol. If yCb>>CtbLog 2SizeY is equal to yColBr>>CtbLog 2SizeY, yColBr is less than or equal to BotBoundaryPos and xColBr is less than or equal to RightBoundary Pos, the following applies. The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX, and control parameter controlParaFlag set equal to 0 as inputs, and the output is assigned to mvLXCol and availableFlagLXCol.

In some examples, the derivation process for temporal luma motion vector prediction is as follows. If yCb>>CtbLog 2SizeY is equal to yColBr>>CtbLog 2SizeY, yColBr is less than pic_height_in_luma_samples and xColBr is less than pic_width_in_luma_samples, the following applies. The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX, and control parameter controlParaFlag set equal to 0 as inputs, and the output is assigned to mvLXCol and availableFlagLXCol. If yCb>>CtbLog 2SizeY is equal to yColBr>>CtbLog 2SizeY, the following applies, xColCtr=Min(xColCtr, RightBoundary Pos) and yColCtr=Min(yColCtr, BotBoundary Pos). The variable colCb specifies the luma coding block covering the modified location given by ((xColBr>>3)<<3, (yColBr>>3)<<3) inside the collocated picture specified by ColPic. The luma location (xColCb, yColCb) is set equal to the top-left sample of the collocated luma coding block specified by colCb relative to the top-left luma sample of the collocated picture specified by ColPic. The derivation process for collocated motion vectors is invoked with currCb, colCb, (xColCb, yColCb), refIdxLX, and control parameter controlParaFlag set equal to 0 as inputs, and the output is assigned to mvLXCol and availableFlagLXCol.

The luma sample interpolation process is as follows. The inputs to this process are: a luma location in full-sample units (xIntL, yIntL): a luma location in fractional-sample units (xFracL, yFracL):and the luma reference sample array refPicLXL. The output of this process is a predicted luma sample value predSampleLXL. The variables shift1, shift2, shift3 are derived as follows. The variable shift1 is set equal to Min(4, BitDepthY−8) and the variable shift2 is set equal to 6 and the variable shift3 is set equal to Max(2, 14−BitDepthY). The predicted luma sample value predSampleLXL is derived as follows. If both xFracL and yFracL are equal to 0, the value of predSampleLXL is derived as follows:
predSampleLXL=refPicLXL[xIntL][yIntL]<<shift3 (8-228)

Otherwise if xFracL is not equal to 0 and yFracL is equal to 0, the value of predSampleLXL is derived as follows:
predSampleLXL=
(fL[xFracL, 0]*refPicLXL[Clip3(LeftBoundaryPos, RightBoundaryPos, xIntL−3)][yIntL]+
fL[xFracL][1]*refPicLXL[Clip3(LeftBoundaryPos, RightBoundaryPos, xIntL−2)][yIntL]+
fL[xFracL][2]*refPicLXL[Clip3(LeftBoundaryPos, RightBoundaryPos, xIntL−1)][yIntL]+
fL[xFracL][3]*refPicLXL[Clip3(LeftBoundaryPos, RightBoundaryPos, xIntL)][yIntL]
+
fL[xFracL][4]*refPicLXL[Clip3(LeftBoundaryPos, RightBoundaryPos, xIntL+1)][yIntL]+(8-228)
fL[xFracL][5]*refPicLXL[Clip3(LeftBoundaryPos, RightBoundaryPos, xIntL+2)][yIntL]+
fL[xFracL][6]*refPicLXL[Clip3(LeftBoundaryPos, RightBoundaryPos, xIntL+3)][yIntL]+
fL[xFracL][7]*refPicLXL[Clip3(LeftBoundaryPos, RightBoundaryPos, xIntL+4)][yIntL])>>shift1

Otherwise if xFracL is equal to 0 and yFracL is not equal to 0, the value of predSampleLXL is derived as follows:
predSampleLXL=
(fL[yFracL, 0]*refPicLXL[xIntL][Clip3(TopBoundaryPos, BotBoundaryPos, yIntL−3)]+
fL[yFracL][1]*refPicLXL[xIntL][Clip3(TopBoundaryPos, BotBoundaryPos, yIntL−2)]+ fL[yFracL][2]*refPicLXL[xIntL][Clip3(TopBoundaryPos, BotBoundaryPos, yIntL−1)]+ fL[yFracL][3]*refPicLXL[xIntL][Clip3(TopBoundaryPos, BotBoundaryPos, yIntL)]+ fL[yFracL][4]*refPicLXL[xIntL][Clip3(TopBoundaryPos, BotBoundaryPos, yIntL+1)]+(8-228)

fL[yFracL][5]*refPicLXL[xIntL][Clip3(TopBoundaryPos, BotBoundaryPos, yIntL+2)]+ fL[yFracL][6]*refPicLXL[xIntL][Clip3(TopBoundaryPos, BotBoundaryPos, yIntL+3)]+ fL[yFracL][7]*refPicLXL[xIntL][Clip3(TopBoundaryPos, BotBoundaryPos, yIntL+4)])>>shift1

Otherwise if xFracL is not equal to 0 and yFracL is not equal to 0, the value of predSampleLXL is derived as follows. The sample array temp[n] with n=0 . . . 7, is derived as follows:

yPosL=Clip3(TopBoundaryPos, BotBoundaryPos, yIntL+n−3) (8-228)

temp[n]=

(fL[xFracL, 0]*refPicLXL[Clip3(LeftBoundaryPos, RightBoundaryPos, xIntL−3)][yPo sL]+ fL[xFracL][1]*refPicLXL[Clip3(LeftBoundaryPos, RightBoundaryPos, xIntL−2)][yPosL]+ fL[xFracL][2]*refPicLXL[Clip3(LeftBoundaryPos, RightBoundaryPos, xIntL−1)][yPosL]+ fL[xFracL][3]*refPicLXL[Clip3(LeftBoundaryPos, RightBoundaryPos, xIntL)][yPosL]+ fL[xFracL][4]*refPicLXL[Clip3(LeftBoundaryPos, RightBoundaryPos, xIntL+1)][yPosL]+(8-228)

fL[xFracL][5]*refPicLXL[Clip3(LeftBoundaryPos, RightBoundaryPos, xIntL+2)][yPosL]+ fL[xFracL][6]*refPicLXL[Clip3(LeftBoundaryPos, RightBoundaryPos, xIntL+3)][yPosL]+ fL[xFracL][7]*refPicLXL[Clip3(LeftBoundary Pos, RightBoundaryPos, xIntL+4)][yPosL])>>shift1

The predicted luma sample value predSampleLXL is derived as follows:

predSampleLXL=(fL[yFracL][0]*temp[0]+ fL[yFracL][1]*temp[1]+ fL[yFracL][2]*temp[2]+ fL[yFracL][3]*temp[3]+ fL[yFracL][4]*temp[4]+(8-228)

fL[yFracL][5]*temp[5]+ fL[yFracL][6]*temp[6]+ fL[yFracL][7]*temp[7])>>shift2

The chroma sample interpolation process is as follows. Inputs to this process are: a chroma location in full-sample units (xIntC, yIntC); a chroma location in eighth fractional-sample units (xFracC, yFracC); and the chroma reference sample array refPicLXC. Output of this process is a predicted chroma sample value predSampleLXC. The variables shift1, shift2, shift3, picWC and picHC are derived as follows. The variable shift1 is set equal to Min(4, BitDepthC−8), the variable shift2 is set equal to 6, and the variable shift3 is set equal to Max(2, 14−BitDepthC). The variable lPos, rPos, tPos and bPos are set as follows:

lPos=LeftBoundaryPos/SubWidthC (8-228)

rPos=(RightBoundaryPos+1)/SubWidthC (8-228)

tPos=TopBoundaryPos/SubHeightC (8-228)

bPos=(BotBoundaryPos+1)/SubHeightC (8-228)

The predicted chorma sample value predSampleLXC is derived as follows. If both xFracC and yFracC are equal to 0, the value of predSampleLXC is derived as follows:

predSampleLXC=refPicLXC[xIntC][yIntC]<<shift3 (8-228)

Otherwise if xFracC is not equal to 0 and yFracC is equal to 0, the value of predSampleLXC is derived as follows:

predSampleLXC=(fC[xFracC][0]*refPicLXC[Clip3 (lPos, rPos, xIntC−1)][yIntC]+ fC[xFracC][1]*refPicLXC[Clip3(lPos, rPos, xIntC)][yIntC]+ fC[xFracC][2]*refPicLXC[Clip3(lPos, rPos, xIntC+1)][yIntC]+(8-228)

fC[xFracC][3]*refPicLXC[Clip3(lPos, rPos, xIntC+2)][yIntC])>>shift1

Otherwise if xFracC is equal to 0 and yFracC is not equal to 0, the value of predSampleLXC is derived as follows:

redSampleLXC=(fC[yFracC][0]*refPicLXC[xIntC] [Clip3(tPos, bPos, yIntC−1)]+ fC[yFracC][1]*refPicLXC[xIntC][Clip3(tPos, bPos, yIntC)]+ fC[yFracC][2]*refPicLXC[xIntC][Clip3(tPos, bPos, yIntC+1)]+(8-228)

fC[yFracC][3]*refPicLXC[xIntC][Clip3(tPos, bPos, yIntC+2)])>>shift1

Otherwise if xFracC is not equal to 0 and yFracC is not equal to 0, the value of predSampleLXC is derived as follows. The sample array temp[n] with n=0 . . . 3, is derived as follows:

yPosC=Clip3(tPos, bPos, yIntC+n−1) (8-228)

TABLE 5

| Fractional sample position p | interpolation filter coefficients | | | | | | | |
|---|---|---|---|---|---|---|---|---|
| | fL[p][0] | fL[p][1] | fL[p][2] | fL[p][3] | fL[p][4] | fL[p][5] | fL[p][6] | fL[p][7] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 | temp[n]=(fC[xFracC][0]*refPicLXC[Clip3(lPos, rPos, xIntC−1)][yPosC]+
fC[xFracC][1]*refPicLXC[Clip3(lPos, rPos, xIntC)][yPosC]+
fC[xFracC][2]*refPicLXC[Clip3(lPos, rPos, xIntC+1)][yPosC]+(8-228)
fC[xFracC][3]*refPicLXC[Clip3(lPos, rPos, xIntC+2)][yPosC])>>shift1

The predicted chroma sample value predSampleLXC is derived as follows:
predSampleLXC=(fC[yFracC][0]*temp[0]+
fC[yFracC][1]*temp[1]+
fC[yFracC][2]*temp[2]+(8-228)
fC[yFracC][3]*temp[3])>>shift2

TABLE 6

| Fractional sample position p | interpolation filter coefficients | | | |
|---|---|---|---|---|
| | fC[p][0] | fC[p][1] | fC[p][2] | fC[p][3] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

The Context-Based Adaptive Binary Arithmetic Coding (CABAC) parsing process for slice data is as follows. The initialization process is invoked when starting the parsing of the CTU syntax and the CTU is the first CTU in a tile. Note that the start of the slice data is also covered by this sentence as each start of the slice data is the start of a tile.

In another example, the CTB raster and tile scanning process is as follows. The list ColWidth[i] for i ranging from 0 to num_tile_columns_minus1, inclusive, specifying the width of the i-th tile column in units of CTBs, is derived as follows:
if(uniform_tile_spacing_flag)
   for(i=0; i<=num_tile_columns_minus1; i++)
      ColWidth[i]=((i+1)*PicWidthInCtbsY)/(num_tile_columns_minus1+1)−
         (i*PicWidthInCtbsY)/(num_tile_columns_minus1+1)
else {
   ColWidth[num_tile_columns_minus1]
      =PicWidthInCtbsY (6-1)
   for(i=0; i<num_tile_columns_minus1; i++) {
      ColWidth[i]=tile_column_width_minus1[i]+1
      ColWidth[num_tile_columns_minus1]−=ColWidth[i]
   }
}
The list RowHeight[j] for j ranging from 0 to num_tile_rows_minus1, inclusive, specifying the height of the j-th tile row in units of CTBs, is derived as follows:
if(uniform_tile_spacing_flag)
   for(j=0; j<=num_tile_rows_minus1; j++)
      RowHeight[j]=((j+1)*PicHeightInCtbsY)/(num_tile_rows_minus1+1)−
         (j*PicHeightInCtbsY)/(num_tile_rows_minus1+1)
else {
   RowHeight[num_tile_rows_minus1]=PicHeightInCtbsY (6-2)
   for(j=0; j<num_tile_rows_minus1; j++) {
      RowHeight[j]=tile_row_height_minus1[j]+1
      RowHeight[num_tile_rows_minus1]−=RowHeight[j]
   }
}
The list ColBd[i] for i ranging from 0 to num_tile_columns_minus1+1, inclusive, specifying the location of the i-th tile column boundary in units of CTBs, is derived as follows:
for(ColBd[0]=0, i=0; i<=num_tile_columns_minus1; i++)
   ColBd[i+1]=ColBd[i]+ColWidth[i] (6-3)
The list RowBd[j] for j ranging from 0 to num_tile_rows_minus1+1, inclusive, specifying the location of the j-th tile row boundary in units of CTBs, is derived as follows:
for(RowBd[0]=0, j=0; j<=num_tile_rows_minus1; j++)
   RowBd[j+1]=RowBd[j]+RowHeight[j] (6-4)
The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, is derived as follows:
for(ctbAddrRs=0; ctbAddrRs<PicSizeInCtbsY;ctbAddrRs++) {
   tbX=ctbAddrRs % PicWidthInCtbsY
   tbY=ctbAddrRs/PicWidthInCtbsY
   for(i=0; i<=num_tile_columns_minus1; i++)
      if(tbX>=ColBd[i])
         tileX=i
   for(j=0; j<=num_tile_rows_minus1; j++) (6-5)
      if(tbY>=RowBd[j])
         tileY=j
   CtbAddrRsToTs[ctbAddrRs]=0
   for(i=0; i<tileX;i++)
      CtbAddrRsToTs[ctbAddrRs]+=RowHeight[tileY]*ColWidth[i]
   for(j=0; j<tileY; j++)
      CtbAddrRsToTs[ctbAddrRs]+
         =PicWidthInCtbsY*RowHeight[j]
   CtbAddrRsToTs[ctbAddrRs]+=(tbY−RowBd[tileY])*ColWidth[tileX]+tbX−ColBd[tileX]
}
The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:
for(ctbAddrRs=0); ctbAddrRs<PicSizeInCtbsY;ctbAddrRs++) (6-6)
   CtbAddrTsToRs[CtbAddrRsToTs[ctbAddrRs]]=ctbAddrRs The list TileId[ctbAddrTs] for ctbAddrTs ranging from 0 to PicSizeInCtbsY−1, inclusive, specifying the conversion from a CTB address in tile scan to a tile ID, is derived as follows:

```
for( j = 0, tileIdx = 0; j <= num_tile_rows_minus1; j++ )         (6-7)
  for( i = 0; i <= num_tile_columns_minus1; i++, tileIdx++ )
    for( y = RowBd[ j ]; y < RowBd[ j + 1 ]; y++ )
      for( x = ColBd[ i ]; x < ColBd[ i + 1 ]; x++ )
        TileId[ Ctb AddrRsToTs[ y * PicWidthInCtbsY+ x ] ] =
          ~~explicit_tile_id_flag ? tile_id_val[ i ][ j ] :~~ tileIdx
```

The list NumCtusInTile[tileIdx] for tileIdx ranging from 0 to PicSizeInCtbsY−1, inclusive, specifying the conversion from a tile index to the number of CTUs in the tile, is derived as follows:

for(j=0, tileIdx=0; j<=num_tile_rows_minus1; j++)
  for(i=0; i<=num_tile_columns_minus1; i++, tileIdx++) (6-8)
    NumCtusInTile[tileIdx]=ColWidth[i]*RowHeight[j]

The set TileIdToIdx[tileId] for a set of NumTilesInPic tileId values specifying the conversion from a tile ID to a tile index and the list FirstCtbAddrTs[tileIdx] for tileIdx ranging from 0 to NumTilesInPic−1, inclusive, specifying the conversion from a tile ID to the CTB address in tile scan of the first CTB in the tile are derived as follows:

for(ctbAddrTs=0, tileIdx=0, tileStartFlag=1; ctbAddrTs<PicSizeInCtbsY:ctbAddrTs++)
{
  if(tileStartFlag) {
    TileIdToIdx[TileId[ctbAddrTs]]=tileIdx
    FirstCtbAddrTs[tileIdx]=ctbAddrTs  (6-9)
    tileStartFlag=0
  }
  tileEndFlag=ctbAddrTs==PicSizeInCtbsY−1||TileId[ctbAddrTs+1]!=TileId[ctbAddrTs]
  if(tileEndFlag) {
    tileIdx++
    tileStartFlag=1
  }
}

The values of ColumnWidthInLumaSamples[i], specifying the width of the i-th tile column in units of luma samples, are set equal to ColWidth[i]<<CtbLog 2SizeY for i ranging from 0 to num_tile_columns_minus1, inclusive. The values of RowHeightInLumaSamples[j], specifying the height of the j-th tile row in units of luma samples, are set equal to RowHeight[j]<<CtbLog 2SizeY for j ranging from 0 to num_tile_rows_minus1, inclusive.

The Picture parameter set RBSP syntax is as follows.

TABLE 7

|  | Descriptor |
|---|---|
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { |  |
|     num_tile_columns_minus1 | ue(v) |
|     num_tile_rows_minus1 | ue(v) |
|   } |  |
|   ~~tile_id_len_minus1~~ | ~~ue(v)~~ |
|   ~~explicit_tile_id_flag~~ | ~~u(1)~~ |
|   ~~if( explicit_tile_id_flag )~~ |  |
|     ~~for( i = 0; i <= num_tile_columns_minus1; i++ )~~ |  |
|       ~~for( j = 0; j <= num_tile_rows_minus1; j++ )~~ |  |
|         ~~tile_id_val[ i ][ j ]~~ | ~~u(v)~~ |
|   if( !single_tile_in_pic_flag ) { |  |
|     uniform_tile_spacing_flag | u(1) |
|     if( !uniform_tile_spacing_flag ) { |  |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|     tile_boundary_treated_as_pic_boundary_flag | u(1) |
|     if( !tile_boundary_treated_as_pic_boundary_flag ) |  |
|       loop_filter_across_tiles_enabled_flag | u(1) |
|   } |  |
|   rbsp_trailing_bits( ) |  |
| } |  |

The slice header syntax is as follows:

TABLE 8

|  | Descriptor |
|---|---|
| slice_header( ) { |  |
|   slice_pic_parameter_set_id | ue(v) |
|   first_slice_in_pic_flag | u(1) |
|   single_tile_in_slice_flag | u(1) |
|   if( !first_slice_in_pic_flag ) |  |
|     top_left_tile_id | u(v) |
|   if( !single_tile_in_slice_flag ) |  |
|     bottom_right_tile_id | u(v) |
|   slice_type | ue(v) |
|   if ( slice_type != I ) |  |
|     log2_diff_ctu_max_bt size | ue(v) |
|   dep_quant_enabled_flag | u(1) |
|   if( !dep_quant_enabled_flag ) |  |
|     sign_data_hiding_enabled_flag | u(1) |
|   all_tiles_mcts_flag | u(1) |
|   if( !tile_boundary_treated_as_pic_boundary_flag && !all_tiles_mcts_flag ) |  |
|     slice_boundary_treated_as_pic_boundary_flag |  |
|   if( !single_tile_in_slice_flag ) { |  |
|     offset len minus1 | ue(v) |
|     for( i = 0; i < NumTilesInSlice − 1; i++ ) |  |

TABLE 8-continued

| | Descriptor |
|---|---|
|     entry_point_offset_minus1[ i ] | u(v) |
|   } | |
|   byte_alignment( ) | |
| } | |

The slice header semantics are as follows. When present, the value of the slice header syntax element slice_pic_parameter_set_id shall be the same in all slice headers of a coded picture. The slice_pic_parameter_set_id specifies the value of pps_pic_parameter_set_id for the PPS in use. The value of slice_pic_parameter_set_id shall be in the range of 0 to 63, inclusive. The first_slice_in_pic_flag is set equal to one to specify that the slice is the first slice of the picture in decoding order. The first_slice_in_pic_flag is set equal to zero to specify that the slice is not the first slice of the picture in decoding order. The single_tile_in_slice_flag is set equal to one to specify that there is only one tile in the slice, single_picture_in_pic_flag equal to 0 specifies that there is more than one tile in the slice. The top_left_tile_id specifies the tile ID of the tile located at the top-left corner of the slice. The length of top_left_tile_id is Ceil(Log 2((num_tile_rows_minus1+1)*(num_tile_columns_minus1+1))) bits. The value of top_left_tile_id shall not be equal to the value of top_left_tile_id of any other coded slice NAL unit of the same coded picture. When not present, the value of top_left_tile_id is inferred to be equal to zero. When there is more than one slice in a picture, the decoding order of the slices in the picture shall be in increasing value of top_left_tile_id. The bottom_right_tile_id specifies the tile ID of the tile located at the bottom-right corner of the slice. The length of bottom_right_tile_id is Ceil(Log 2((num_tile_rows_minus1+1)*(num_tile_columns_minus1+1))) bits. When not present, the value of bottom_right_tile_id is inferred to be equal to top_left_tile_id. The variables NumTileRowsInSlice, NumTileColumnsInSlice, and NumTilesInSlice are derived as follows:

deltaTileIdx=TileIdToIdx[bottom_right_tile_id]−TileIdToIdx[top_left_tile_id]
    NumTileRowsInSlice=(deltaTileIdx/(num_tile_columns_minus1+1))+1 (7-25)
    NumTileColumnsInSlice=(deltaTileIdx % (num_tile_columns_minus1+1))+1
    NumTilesInSlice=NumTileRowsInSlice*NumTileColumnsInSlice The all_tiles_mcts_flag is set equal to one to specify that all tiles in the slice are part of an MCTS, which only contains the tiles in the slice for the current access unit, and the MCTS boundaries (which collocate with the slice boundaries of the slice) are treated the same as the picture boundaries. The all_tiles_mcts_flag is set equal to zero to specify that the above as specified by all_tiles_mcts_flag equal to 1 may or may not apply. The slice_boundary_treated_as_pic_boundary_flag is set equal to one to specify that each slice boundary of the slice is treated the same as the picture boundary in the decoding process. The slice_boundary_treated_as_pic_boundary_flag is set equal to zero to specify that each tile boundary may or may not be treated the same as the picture boundary in the decoding process. When not present, the value of slice_boundary_treated_as_pic_boundary_flag is inferred to be equal to one. Each subset shall include all coded bits of all CTUs in the slice that are within the same tile.

Figure 7:
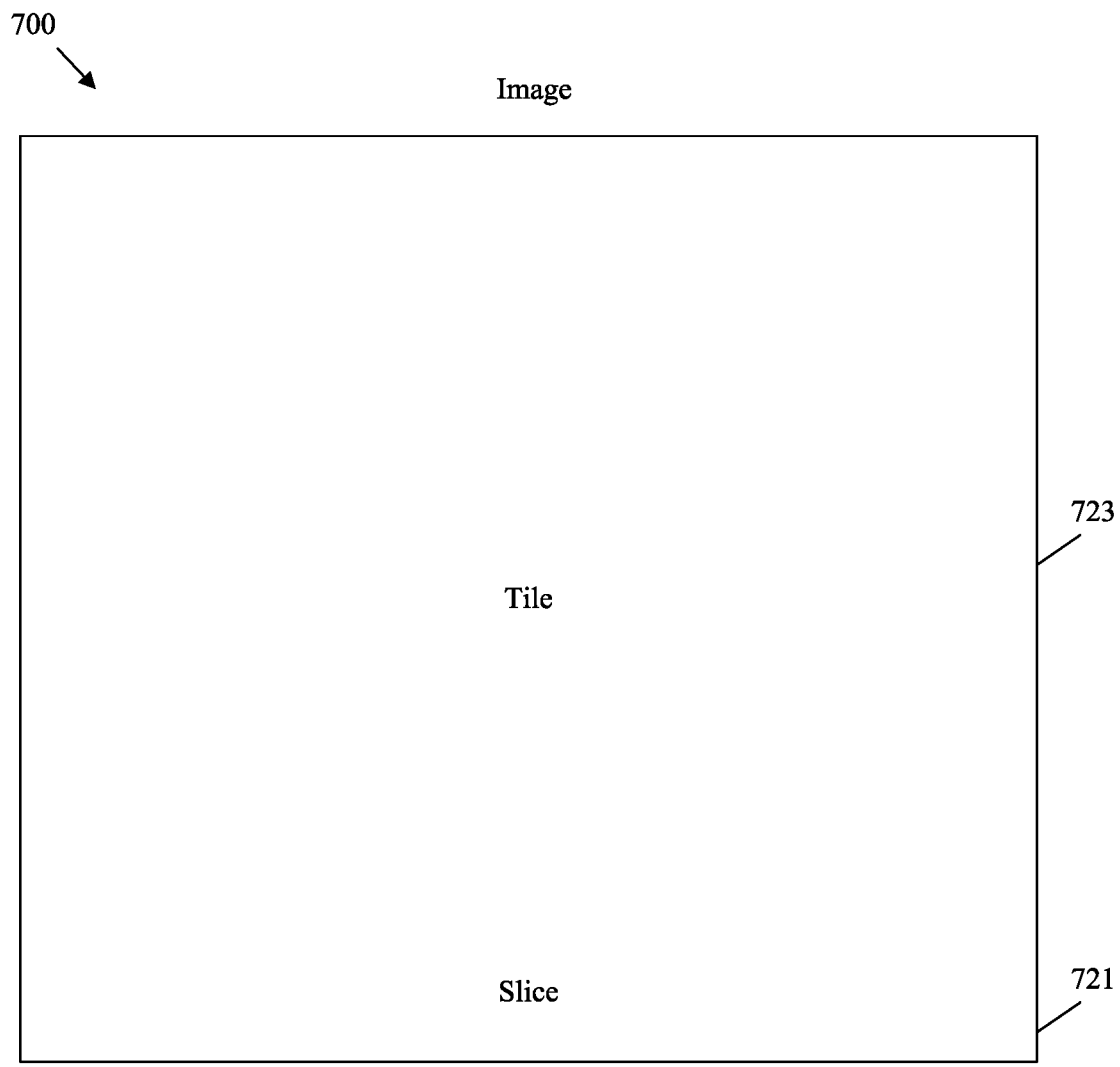
FIG. 7 is a schematic diagram of an example image with a slice containing a single tile.

FIG. 7 is a schematic diagram of an example image 700 with a slice containing a single tile. For example, image 700 may be employed to implement an image 600. Further, image 700 can be encoded in and decoded from a bitstream 500, for example by a codec system 200, an encoder 300, and/or a decoder 400. Further, the image 700 can be partitioned to support encoding and decoding according to method 100.

The image 700 can include a slice 721 and a tile 723, which may be substantially similar to a slice 521 and/or 621 and a tile 523 and/or 623, respectively. In some cases, a slice 721 may contain a single tile 723. In some cases, an image 700 may contain a single tile 723. FIG. 7 depicts both of these cases. The tile 723 may be further subdivided into CTUs and coding blocks for encoding/decoding. This scenario may occur when a slice 721 and/or image 700 contains little visual data. For example, a slice 721 may contain a single tile 723 when the slice 721 contains a large amount of white space and/or black space with little or no additional visual information (e.g., the slice contains a blinding spotlight or a black cave/building entrance). As another example, an image 700 may contain a single tile 723 when the entire image is white and/or black, for example during a fade between scenes. Such occurrences are relatively common in video sequences. Slicing and tiling schemes provide support for relatively complex computations for use in compressing high resolution images with significant detail. However, such complex computations employ significant input data and use significant processing resources at a decoder. Such computations may not provide additional visual information for an image such as image 700 and may require inputs that would reduce compression.

Accordingly, an encoder can use one or more flags to signal when a scenario as described with respect to image 700 occurs. A decoder can read such flags and omit corresponding computations, which reduces computation resource usage at the decoder. As such computations are omitted, the related inputs can also be omitted from the bitstream, which increases compression and coding efficiency. Examples of data that can be omitted includes slice 721 boundaries (as there is only one slice 721 when there is only one tile 723 in the image 700), tile IDs, tile column data tile row data, tile spacing data, and/or tile entry point offsets. Computations that can be omitted include determining a bottom right tile ID as part of determining a slice 721 boundary, determining tile 723 entry point offsets, determining tile columns and rows, determining the number of tiles, determining tile spacing, etc. In one example, a single_tile_in_slice_flag can be set to indicate that there is only one tile 723 in a slice 721. The single_tile_in_slice_flag can be signaled in a slice header, such as slice header 514, associated with the slice 721. In another example, a single_tile_in_pic_flag can be set to indicate that there is only one tile 723 in an image 700. The single_tile_in_pic_flag can be signaled in a PPS, such as PPS 512, associated with the image 700.

Figure 8:
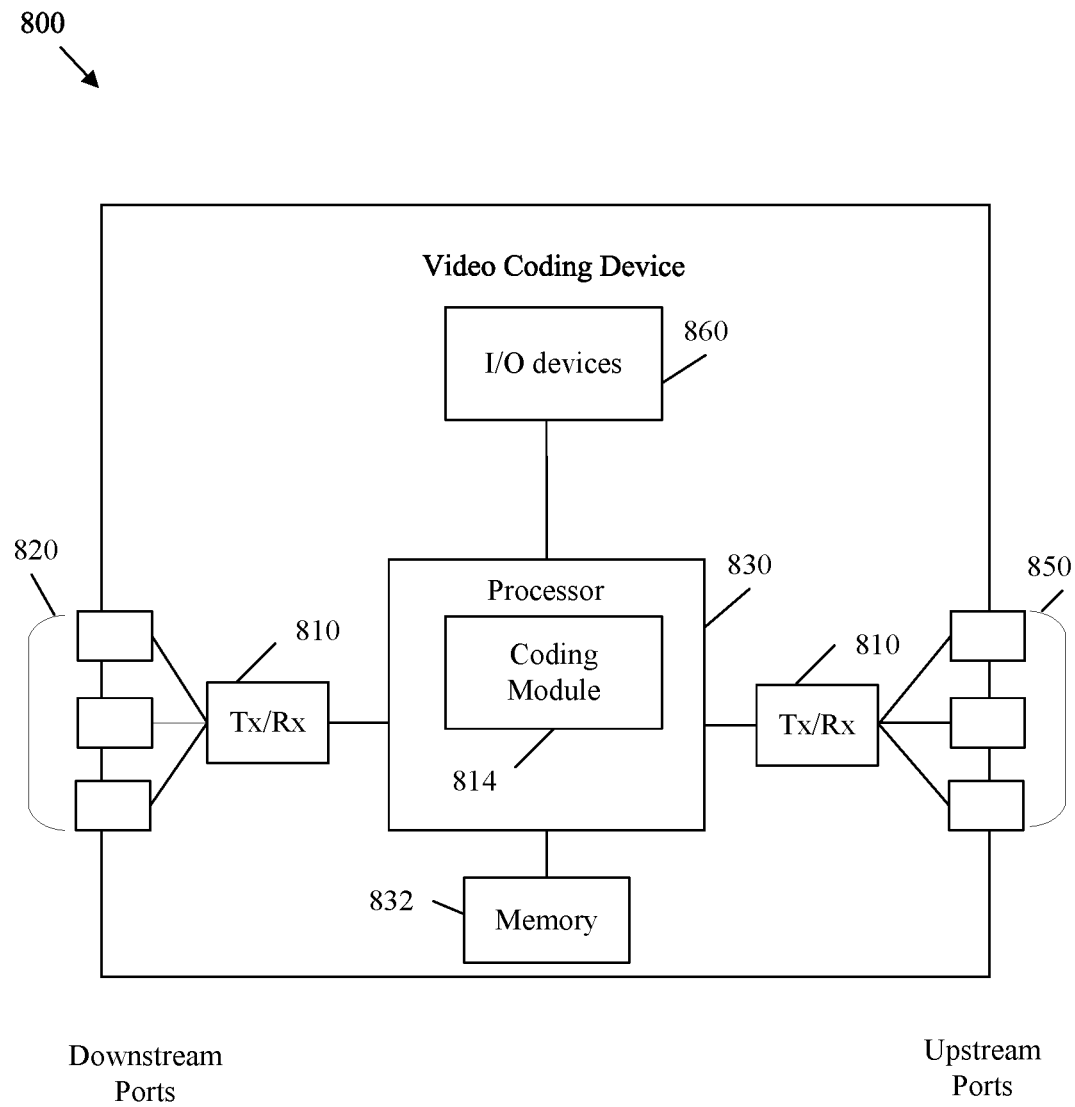
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820. Tx/Rx 810, upstream ports 850, and memory 832. The processor 830 comprises a coding module 814. The coding module 814 implements the disclosed embodiments described above, such as methods 100, 900, and 1000, which may employ a bitstream 500, an image 600, and/or an image 700. The coding module 814 may also implement any other method/mechanism described herein. Further, the coding module 814 may implement a codec system 200, an encoder 300, and/or a decoder 400. For example, the coding module 814 can partition an image into slices, slices into tiles, tiles into CTUs, CTUs into blocks, and encode the blocks when acting as an encoder. Further, the coding module 814 can signal, via a flag in a bitstream, when an image and/or a slice contains a single tile. In addition, when acting as a decoder, the coding module 814 can determine when an image and/or a slice contains a single tile by reading such flags from the bitstream. This allows the decoder to omit various computations related to a multi-tile environment, which increases compression and coding efficiency while decreasing computation time at the decoder. As such, the coding module 814 causes the video coding device 800 to provide additional functionality and/or coding efficiency when partitioning and coding video data. As such, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

Figure 9:
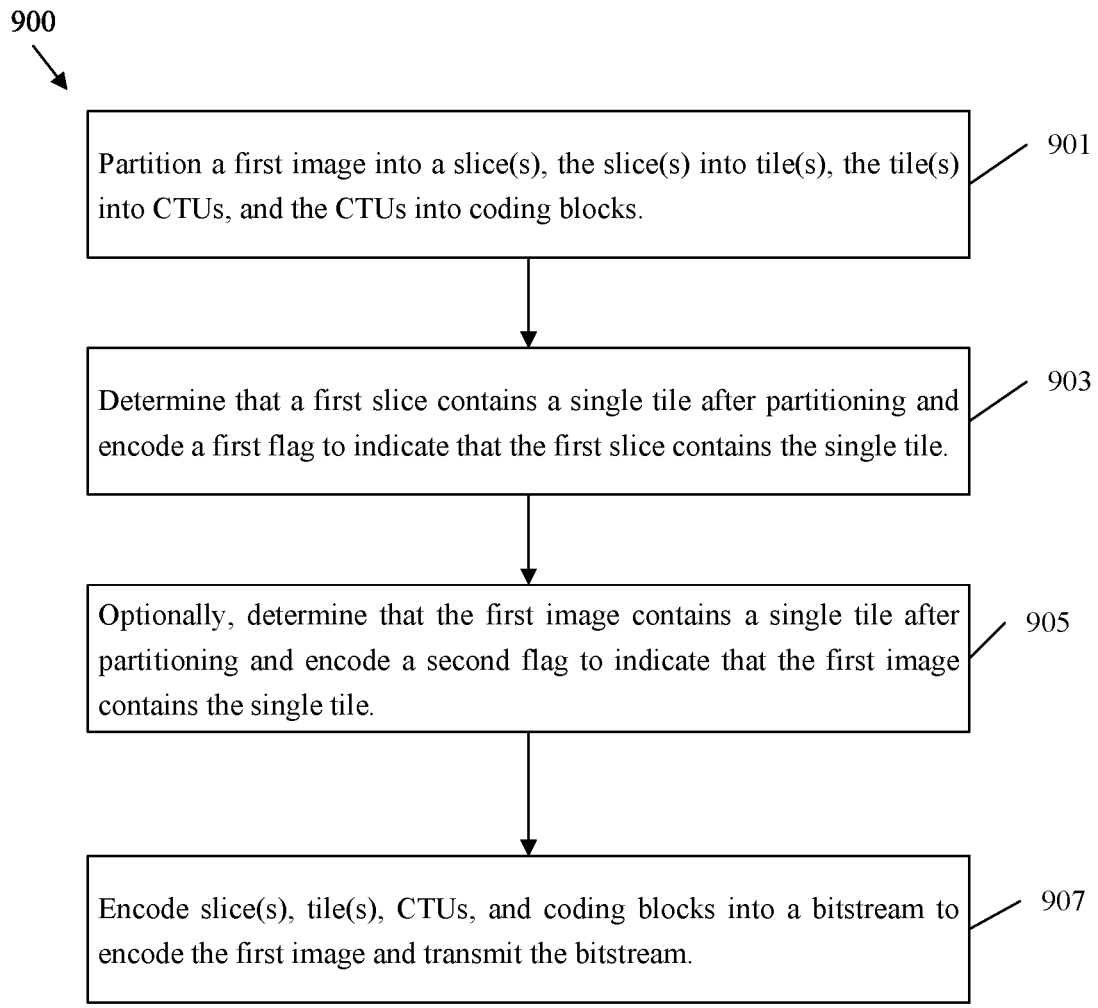
FIG. 9 is a flowchart of an example method of encoding an image with a slice containing a single tile into a bitstream.

FIG. 9 is a flowchart of an example method 900 of encoding an image, such as image 600 and/or 700, with a slice containing a single tile into a bitstream, such as bitstream 500. Method 900 may be employed by an encoder, such as a codec system 200, an encoder 300, and/or a video coding device 800 when performing method 100.

Method 900 may begin when an encoder receives a video sequence including a plurality of images and determines to encode that video sequence into a bitstream, for example based on user input. The video sequence is partitioned into pictures/images/frames for further partitioning prior to encoding. At step 901, a first image is partitioned into one or more slices. The slice(s) are partitioned into one or more tiles. The tiles are partitioned into one or more CTUs. The CTUs are further partitioned into one or more coding blocks.

At step 903, the encoder determines that a first slice in the first image contains a single tile after partitioning. The encoder can then encode a first flag into a bitstream to indicate that the first slice contains the single tile. For example, the first flag can be encoded in a slice header associated with the first slice. As a specific example, the first flag may be a single_tile_in_slice_flag set to one to indicate that there is only one tile in the first slice. The encoder may also omit certain items from the bitstream when the first flag is set. For example, the encoder may omit a bottom right tile ID for the first slice from the bitstream based on the determination that the first slice contains the single tile. As another example, the encoder may omit entry point offsets associated with the tiles for the first slice from the bitstream based on the determination that the first slice contains the single tile.

At optional step 905, the encoder may determine that the first image, which contains the first slice, also contains a single tile after partitioning. The encoder can then encode a second flag into the bitstream to indicate that the first image contains the single tile. For example, the second flag can be encoded in a PPS associated with the first image. As a specific example, the second flag may be a single_tile_in_pic_flag set to one to indicate that there is only one tile in the first image. The encoder may also omit certain items from the bitstream when the second flag is set. For example, the encoder may omit data related to the columns and rows of tiles in the first image when the second flag is set.

At step 907, the encoder encodes the first image, the first slice, the single tile, CTUs, and coding block(s) into the bitstream. The encoder can then transmit the bitstream containing the first flag and/or the second flag to support decoding the first slice and/or the first image.

Figure 10:
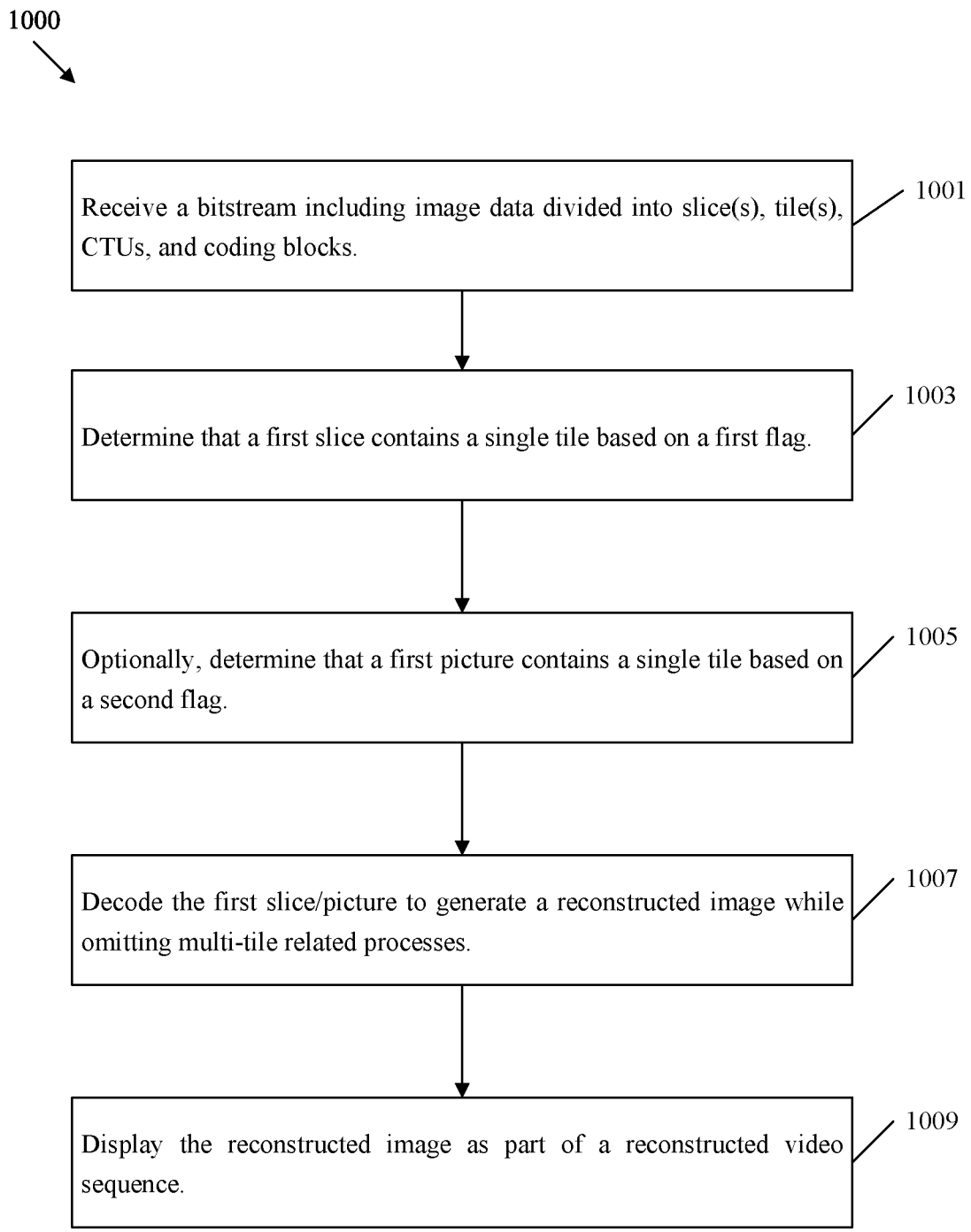
FIG. 10 is a flowchart of an example method of decoding an image with a slice containing a single tile from a bitstream.

FIG. 10 is a flowchart of an example method 1000 of decoding an image, such as an image 600 and/or 700, with a slice containing a single tile from a bitstream, such as bitstream 500. Method 1000 may be employed by a decoder, such as a codec system 200, a decoder 400, and/or a video coding device 800 when performing method 100.

Method 1000 may begin when a decoder begins receiving a bitstream of coded data representing a video sequence, for example as a result of method 900. At step 1001, a bitstream is received at a decoder. The bitstream includes image data divided into one or more slices, which are further divided into one or more tiles. The tile(s) are further divided into CTUs, which are divided into coding blocks.

At step 1003, the decoder determines that a first slice in the image data contains a single tile based on a first flag. For example, the first flag can be obtained from a slice header associated with the first slice. As a specific example, the first flag may be a single_tile_in_slice_flag set to one to indicate that there is only one tile in the first slice. The decoder may omit certain processes when the first flag is set. For example, a search for a bottom right tile ID for the first slice can be omitted during decoding based on the determination that the first slice contains the single tile. As another example, a search for entry point offsets associated with the tiles for the first slice may also be omitted based on the determination that the first slice contains the single tile.

At step 1005, the decoder may optionally also determine that a first picture in the image data contains the single tile based on a second flag. For example, the second flag can be encoded in a PPS associated with the first picture. As a specific example, the second flag may be a single_tile_in_pic_flag set to one to indicate that there is only one tile in the first picture. The decoder may omit certain processes when the second flag is set. For example, the decoder may omit processes related to determining tile rows and tile columns for the first picture when the second flag is set and based on the determination that the first picture contains the single tile.

At step 1007, the decoder can decode the first slice to generate a reconstructed image. Further, the first slice may be decoded as part of decoding the first picture to generate the reconstructed image. The decoder can also forward the reconstructed image toward a display as part of a reconstructed video sequence at step 1009.

Figure 11:
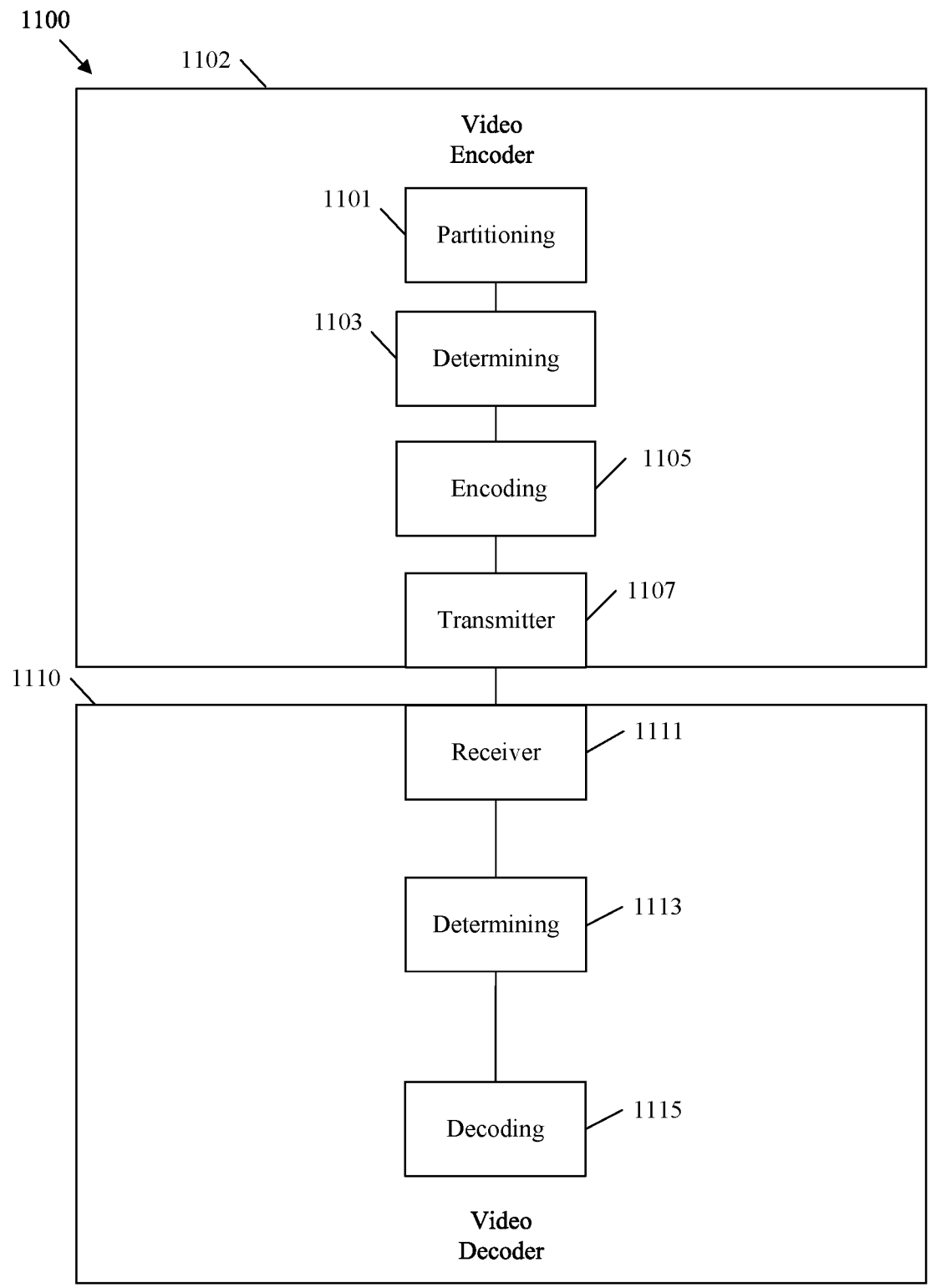
FIG. 11 is a schematic diagram of an example system for coding an image containing a single slice and/or tile in a bitstream.

FIG. 11 is a schematic diagram of an example system 1100 for coding an image, such as an image 600 and/or 700, containing a single slice and/or tile in a bitstream, such as bitstream 500. System 1100 may be implemented by an encoder and a decoder such as a codec system 200, an encoder 300, a decoder 400, and/or a video coding device 800. Further, system 1100 may be employed when implementing method 100, 900, and/or 1000.

The system 1100 includes a video encoder 1102. The video encoder 1102 comprises a partitioning module 1101 for partitioning a first image into one or more slices and one or more tiles. The video encoder 1102 further comprises a determining module 1103 for determining that a first slice contains a single tile after partitioning. The video encoder 1102 further comprises an encoding module 1105 for encoding a first flag to indicate that the first slice contains the single tile, and encoding the first slice into a bitstream. The video encoder 1102 further comprises a transmitting module 1107 for transmitting the bitstream containing the first flag to support decoding the first slice. The video encoder 1102 may be further configured to perform any of the steps of method 900.

The system 1100 also includes a video decoder 1110. The video decoder 1110 comprises a receiving module 1111 for receiving a bitstream including image data divided into one or more slices and one or more tiles. The video decoder 1110 further comprises a determining module 1113 for determining that a first slice contains a single tile based on a first flag. The video decoder 1110 further comprises a decoding module 1115 for decoding the first slice to generate a reconstructed image. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
   receiving a bitstream including a picture divided into one or more slices, wherein the one or more slices are further divided into one or more tiles;
   determining a number of the tiles in a first slice based on a first parameter;
   determining whether the picture comprises only one tile based on a first flag;
   determining a second parameter that specifies a tile index of a tile in the first slice that contains a first coding tree unit (CTU), wherein coding tree block (CTB) addresses for the one or more slices are included in a range from zero to picture size in luma coding tree blocks (PicSizeInCtbsY)−1;
   determining a number of entry points in the first slice based on the number of the tiles, wherein an entry point offset minus one (entry_point_offset_minus1[i]) plus one syntax element specifies each ith entry point offset in bytes based on the number of entry points, wherein the bitstream is a sub-bitstream of a coded bitstream, and wherein a header of the first slice has not been rewritten due to the bitstream lacking at least one tile of the picture from the coded bitstream; and
   decoding the first slice to decode the picture based on the first parameter and the second parameter.

2. The method of claim 1, wherein the first parameter is a single_tile_in_slice_flag set to one to indicate that there is only one tile in the first slice.

3. The method of claim 1, wherein the first parameter is coded in a slice header.

4. The method of claim 1, wherein decoding the first slice includes omitting a search for a bottom right tile identifier (ID) for the first slice when the first slice contains a single tile.

5. The method of claim 1, wherein decoding the first slice includes omitting a search for entry point offsets associated with tiles for the first slice when the first slice contains a single tile.

6. The method of claim 1, further comprising determining that the picture contains a single tile based on the second parameter.

7. The method of claim 6, wherein the second parameter is a single_tile_in_pic_flag set in a picture parameter set associated with the picture.

8. The method of claim 6, wherein decoding the first slice is performed as part of decoding the picture, and wherein decoding the picture includes omitting a determination of tile rows and tile columns for the picture based on the determination that the picture contains the single tile.

9. The method of claim 1, further comprising forwarding the picture toward a display as part of a reconstructed video sequence.

10. A method implemented in an encoder, the method comprising:
    partitioning a picture into one or more slices, wherein the one or more slices are further partitioned into one or more tiles;
    determining a number of tiles in a first slice of the picture after partitioning;
    encoding a first parameter to indicate the number of the tiles in the first slice;
    encoding a first flag indicating whether the picture comprises only one tile;
    determining a second parameter that specifies a tile index of a tile in the first slice that contains a first coding tree unit (CTU), wherein coding tree block (CTB) addresses for the one or more slices are included in a range from zero to picture size in luma coding tree blocks (PicSizeInCtbsY)−1;
    encoding the first slice into a bitstream, wherein a number of entry points in the first slice is based on the number of the tiles, and wherein an entry point offset minus one (entry_point_offset_minus1[i]) plus one syntax element specifies each ith entry point offset in bytes based on the number of entry points, wherein the bitstream is a sub-bitstream of a coded bitstream, and wherein a header of the first slice has not been rewritten due to the bitstream lacking at least one tile of the picture from the coded bitstream; and
    transmitting the bitstream containing the first parameter to support decoding the first slice.

11. The method of claim 10, wherein the first parameter is a single_tile_in_slice_flag set to one to indicate that there is only one tile in the first slice.

12. The method of claim 10, wherein the first parameter is encoded in a slice header.

13. The method of claim 10, wherein a bottom right tile identifier (ID) for the first slice is omitted from the bitstream when the first slice contains a single tile.

14. The method of claim 10, wherein entry point offsets associated with tiles for the first slice are omitted from the bitstream when the first slice contains a single tile.

15. The method of claim 10, further comprising:
    determining that the picture contains a single tile after partitioning; and
    encoding a single_tile_in_pic_flag in a picture parameter set associated with the picture to indicate that the picture contains the single tile.

16. A video coding device comprising:
    a receiver configured to receive a bitstream including a picture divided into one or more slices, wherein the one or more slices are further divided into one or more tiles; and
    a processor configured to:
        determine a number of the tiles in a first slice based on a first parameter;
        determine whether the picture comprises only one tile based on a first flag;
        determine a second parameter that specifies a tile index of a tile in the first slice that contains a first coding tree unit (CTU), wherein coding tree block (CTB) addresses for the one or more slices are included in a range from zero to picture size in luma coding tree blocks (PicSizeInCtbsY)−1;
        determine a number of entry points in the first slice based on the number of the tiles, wherein an entry point offset minus one (entry_point_offset_minus1[i]) plus one syntax element specifies each ith entry point offset in bytes based on the number of entry points, wherein the bitstream is a sub-bitstream of a coded bitstream, and wherein a header of the first slice has not been rewritten due to the bitstream lacking at least one tile of the picture from the coded bitstream; and
        decode the first slice to decode the picture based on the first parameter and the second parameter.

17. The video coding device of claim 16, wherein the first parameter is a single_tile_in_slice_flag set to one to indicate that there is only one tile in the first slice.

18. The video coding device of claim 16, wherein the first parameter is coded in a slice header.

19. The video coding device of claim 16, wherein decoding the first slice includes omitting a search for a bottom right tile identifier (ID) for the first slice when the first slice contains a single tile.

20. The video coding device of claim 16, wherein decoding the first slice includes omitting a search for entry point offsets associated with tiles for the first slice when the first slice contains a single tile.

* * * * *